(12) United States Patent
Salesin et al.

(10) Patent No.: US 7,568,154 B2
(45) Date of Patent: *Jul. 28, 2009

(54) SYSTEM AND METHOD FOR ADAPTIVE DOCUMENT LAYOUT VIA MANIFOLD CONTENT

(75) Inventors: David Salesin, Seattle, WA (US); Charles Jacobs, Seattle, WA (US); Wilmot Li, Seattle, WA (US)

(73) Assignee: Microsoft Corp., Redmond, WA (US)

( * ) Notice: Subject to any disclaimer, the term of this patent is extended or adjusted under 35 U.S.C. 154(b) by 502 days.

This patent is subject to a terminal disclaimer.

(21) Appl. No.: 11/145,070

(22) Filed: Jun. 3, 2005

(65) Prior Publication Data

US 2006/0010375 A1 Jan. 12, 2006

Related U.S. Application Data

(63) Continuation of application No. 10/159,627, filed on May 30, 2002, now Pat. No. 7,120,868.

(51) Int. Cl.
*G06F 17/00* (2006.01)

(52) U.S. Cl. .................. 715/243; 715/229; 715/234

(58) Field of Classification Search .................. 715/243, 715/229, 234, 252, 513, 500, 501.1, 520, 715/522, 517, 244, 210
See application file for complete search history.

(56) References Cited

U.S. PATENT DOCUMENTS

| | | | | |
|---|---|---|---|---|
| 5,060,155 A | * | 10/1991 | van Zuijlen | 704/9 |
| 5,668,966 A | * | 9/1997 | Ono et al. | 715/853 |
| 5,864,805 A | * | 1/1999 | Chen et al. | 704/235 |
| 5,909,667 A | * | 6/1999 | Leontiades et al. | 704/275 |
| 5,956,737 A | * | 9/1999 | King et al. | 715/202 |
| 6,163,785 A | * | 12/2000 | Carbonell et al. | 715/236 |
| 6,424,979 B1 | * | 7/2002 | Livingston et al. | 715/206 |
| 6,430,624 B1 | * | 8/2002 | Jamtgaard et al. | 709/246 |
| 2001/0021928 A1 | * | 9/2001 | Ludwig et al. | 705/67 |
| 2001/0054049 A1 | * | 12/2001 | Maeda et al. | 707/517 |
| 2003/0004836 A1 | * | 1/2003 | Otter et al. | 705/27 |
| 2003/0101164 A1 | * | 5/2003 | Pic et al. | 707/1 |
| 2004/0034520 A1 | * | 2/2004 | Langkilde-Geary et al. | 704/1 |
| 2004/0034651 A1 | * | 2/2004 | Gupta et al. | 707/102 |
| 2004/0078190 A1 | * | 4/2004 | Fass et al. | 704/7 |
| 2004/0186705 A1 | * | 9/2004 | Morgan et al. | 704/9 |

OTHER PUBLICATIONS

MicrosoftWord 2002 (hereinafter Word), copyright 2001, pp. 1-14.*

(Continued)

*Primary Examiner*—Thu Huynh
(74) *Attorney, Agent, or Firm*—Lyon & Harr, LLP; Katrina A. Lyon

(57) ABSTRACT

A system and method for improving document layout on arbitrary devices of different resolutions and size using manifold representations of content. Manifold representations of content are: multiple versions of anything that might appear in a document, from text, to images, to even such things as stylistic conventions. The specific content is selected and formatted dynamically, on the fly, by a layout engine in order to best adapt to a given viewing situation. A user interface for authoring and editing such manifold content is disclosed.

10 Claims, 21 Drawing Sheets
(11 of 21 Drawing Sheet(s) Filed in Color)

OTHER PUBLICATIONS

Badros, G., Alan Borning, Kim Marriott, and Peter Stuckey. Constraint cascading style sheets for the web. In *ACM User Interface Software and Technology Conference Proceedings*, 1999.

Badros, G., Jeffrey Nichols, and Alan Borning. Scwm—an intelligent contraint-enabled window manager. In *AAAI Smart Graphics Conference Proceedings*, 2000.

Borning, A., Richard Lin, and Kim Marriott. Constraints for the web. In *ACM Multimedia Conference Proceedings*, pp. 173-182, Nov. 1997.

Borning, A., Richard Lin, and Kim Marriott. Constraint-based document lay-out for the web. *Multimedia Systems*, 8:177-189, 2000.

Borning, A., Kim Marriott, Peter Stuckey, and Yi Xiao. Solving linear arithmetic contraints for user interface applications. In *ACM User Interface Software and Technology Conference Proceedings*, pp. 87-96, Oct. 1997.

Furuta, R., J. Schofield, and A. Shaw. Document formatting systems: Survey, concepts and issues. *ACM Computing Surveys*, pp. 417-472, 1982.

Johari, R., J. Marks, A. Partovi, and S. Shieber. Automatic yellow-pages pagination and layout. Technical report, MERL, 1996.

Knuth, D.E. and Michael F. Plass. Breaking paragraphs into lines. *Software—Practice and Experience*, 11:1119-1184, 1981.

Peels, A.J.H.,Norbert T. M. Janssen, and Wop Nawijn. Document architecture and text formatting. *ACM Transactions on Information Systems*, 1985.

Weitzman, L. and Kent Wittenburg. Automatic presentation of multimedia documents using relational grammars. In *ACM Multimedia Conference Proceedings*, pp. 443-451, Oct. 1994.

\* cited by examiner

FIG. 15A
FIG. 15B
FIG. 15C

SYSTEM AND METHOD FOR ADAPTIVE DOCUMENT LAYOUT VIA MANIFOLD CONTENT

CROSS-REFERENCE TO RELATED APPLICATIONS

This application is a continuation of a prior application entitled "A SYSTEM AND METHOD FOR ADAPTIVE DOCUMENT LAYOUT VIA MANIFOLD CONTENT" which was assigned Ser. No. 10/159,627 and filed May 30, 2002, and issued as U.S. Pat. No. 7,120,868.

BACKGROUND

1. Technical Field

This invention is directed toward a system and process for adaptive document layout. More particularly, this invention is directed toward a system and process for adapting document layouts to devices of different resolutions and sizes.

2. Background Art

Paper documents are, by their very nature, static affairs. Their physical nature confines them to a single immutable layout on a single-size sheet of paper. Electronic documents, by contrast, can and should be much more dynamic. Most importantly, they should adapt seamlessly and attractively to the size and proportions of the display on which they appear—be it a standard monitor, a tiny Personal Data Assistant (PDA) screen, or a certain format of paper. In addition, the dynamic nature of an electronic medium should offer the possibility of adapting the content dynamically for a particular type of reader or reading situation—providing a summary view for one reader and an in-depth view for another.

Electronic documents today fall woefully short of these ideals. In general, they provide an impoverished layout in comparison with their traditional, physical counterparts. Moreover, they provide only an exceedingly limited ability to adapt to different displays. Typically, either the width of the text is expanded to fill the available window or screen, in which case the text quickly becomes illegible—or the text area is kept fixed, which solves the first problem but requires inconvenient scrolling whenever the text area is too large for the target display. Indeed, to address these shortcomings, in practice two distinct versions of a document are often supplied: a Portable Document File (PDF) version, which generally includes more carefully thought-out design elements and layout, but at the expense of nearly all adaptability; and a Hypertext Markup Language (HTML) version, which is generally easier to read on most standard-sized screens, but whose graphics and layout are meager in comparison with those of the PDF.

Good automatic and adaptive layout is fundamentally hard. Consider, for example, a document with a single, large, multicolumn sidebar. The sidebar may look fine on the right side of a two-page spread or a wide-screen display. But on a legal-sized sheet of paper or on a portrait display, the "sidebar" may actually have to be placed at the bottom of the page so as not to squeeze out the main story. And on a PDA, this same "sidebar" might have to be moved to a separate page entirely, perhaps made available through an HTML link from the main page. The problem is of course compounded for more complex layouts, such as those involving multiple sidebars, figures, pull quotes, and so on—all being merged into a single page design.

Even more tricky, in many respects, is the need for editorial changes to content to make a given layout work. As Knuth, in some of his seminal work on typesetting, acknowledges, a "computer should, in fact, be able to solve the typesetting problem better than a skilled typesetter could do by hand in a reasonable amount of time—unless we give this person the liberty to change the wording in order to obtain a better fit" [8] (emphasis added). As any person who has ever prepared a technical paper submission (or any other camera-ready document) knows, often one is forced to make last-minute changes to the figures or text in order to, say, squeeze everything into the stringent page limits, produce more favorable juxtapositions of figures and text, or eliminate annoying "widows" or "orphans" (single lines of text that are separated from their paragraphs and appear alone at the top or bottom of a page or column).

One might add that this inability to adapt document layouts to different display sizes is becoming a more and more critical problem, as the variety of new and differently sized display devices proliferates. The problem is also exacerbated, in a sense, by the rapidly increasing screen resolutions available on LCD displays. These displays make practical increasingly complex page layouts and graphical designs that come closer all the time to rivaling those that can be rendered on the printed page. Thus, any deficit in the available quality of documents rendered on the screen versus the printed page becomes all the more apparent and egregious.

Early work in document layout focused largely on text formatting, the arrangement of text into lines, paragraphs, and higher-level semantic structures [6, 8, 10]. More recently, researchers have begun to focus on the page layout problem, whereby relational grammars [11], constraints [1, 2, 3, 4, 5], or various forms of optimization [13] are used to arrange different elements onto a page while satisfying some notion of "goodness." Recently, several standards, endorsed by the World-Wide-Web Consortium (W3C), have emerged to support the decoupling of a document's content from its stylistic formatting rules, most notably the Extensible Stylesheet Language (XSL) and Cascading Style Sheets (CSS) [9]. A constraint-based version of Cascading Style Sheets (CCSS) has also been proposed [1].

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The adaptive document layout system and method of the present invention overcomes the aforementioned limitations in systems and methods for document layout. This adaptive document layout technique provides a simple, new approach to the document layout problem—the problem of automatically laying out pages of text and graphics so that they maintain a consistent graphical style, while conforming to the size and proportions of the display on which they appear.

The adaptive document layout system and method allows manifold representations of content—that is, multiple versions of anything that might appear in a document, whether it be text, graphics, images, or even such things as stylistic conventions or user interface controls. This content is then selected and formatted dynamically to fit the viewing situation—that is, the display device being used, as well as, potentially, any additional preferences or constraints, such as the preferences of the reader (for example, for a large-text display or for a summary view), or constraints on the available computing power or bandwidth.

The adaptive document layout system and method creates a representation for this manifold content, one that is flexible enough to represent multiple versions of all possible types of content that might appear in a document, namely a document tree. An authoring system is provided for manipulating this content, with a user interface that makes handling all of these multifarious versions natural and straight forward. Additionally, a layout engine is provided that adapts and formats a document's manifold content automatically, in real time.

As indicated above, the manifold representations of document content are organized in a tree data structure, named a document tree. Each branch of the document tree represents an alternate version of document content. That is, the document tree originates in an AND node and contains one or more children of alternate document content. OR nodes are used to organize the manifold representations of document content in the document tree. Specifically, AND nodes are used to specify contiguous representations of document content, and OR nodes are used to specify one of a plurality of pieces of document content in the document tree. The document tree can be divided into sub-trees. Two sub-trees are considered equivalent if their structure creates identical sets of document views. A document view represents one version of a document based on a certain combination of representations of document content.

In practice the Extensible Markup Language (XML) file format is used to specify the document tree. Attributes associated with each representation of document content are specified and are later used in laying out the final document view.

The aforementioned manifold representations of document content are created and edited using the authoring tool. A new representation of document content typically begins by inputting selected document content and the aforementioned document tree. The system then looks for a document sub-tree that can exactly generate the region of selected document content. If an exact sub-tree is not found, a new sub-tree corresponding to the region of selected document content is created. Once an exact sub-tree corresponding to the selected document content is found or created, a new representation of manifold content is created by modifying the document tree so that the sub-tree corresponding to the region of selected document content becomes a child of a new OR node within the document tree. The new representation of manifold content associated with the new OR node is combined under an AND node with the document content before it and the document content after it.

User modifications to the representations of content modify the document tree. Deleting a version of document content will delete an OR node associated with the document content from the document tree. Copying a version of alternate content will duplicate this copied version of alternate version as a sub-tree to the document tree. Copying a version of alternate content using a special copy operation will copy a selected region of alternate content but not preserve its underlying structure in the document tree.

The adaptive document layout system and method also includes a graphic user interface for authoring the aforementioned alternate versions of document content. This user interface (UI) includes an edit view pane for displaying a linear version of document content. It also includes an alternate version view pane for displaying alternate versions of document content.

Alternate versions of document content are indicated by a line beneath that portion of document content. Hovering with an input device cursor over a region of document content brings up a menu of editing choices. In an exemplary working embodiment this menu includes the following user options: 1) select version, which when activated highlights selected content in said alternate version view pane along with other un-highlighted versions of document content; 2) pop selection, which when activated displays the highest level of alternate version content if nested versions of alternate content exist; 3) create version, which when activated creates a version of alternate content; and 4) freeze version, which when activated prevents a version of alternate content from being changed.

The user can change a version of alternate content that is displayed in the edit view pane by selecting a second version of alternate content displayed in the alternate version view pane. This second version of alternate content then replaces the original version in the edit view pane. In one embodiment, a triangle is drawn to the left margin of the beginning of each piece of alternate version content in the alternate version view pane to indicate a start of an alternate version of document content. Hovering over a portion of alternate content with an input device cursor in the alternate version pane provides a menu of user options. This menu allows a user to add a version of alternate content; delete a version of alternate content or copy a version of alternate content. The authoring UI also includes text-editing functionality including selecting font type, selecting font size, and selecting font style.

The adaptive document layout system and method automatically formats said versions of content to fit a given display. For example, the display may be a hand-held device; a wide-screen display, or a standard computer monitor. In laying out the adaptive document attributes associated with each version of alternate content are utilized. These include attributes concerning page size, column size, page coverage and figure size.

In the most general sense, when laying out the document, the document tree and a rectangular region wherein the content is to be displayed is input into the system. The document tree is traversed and appropriate layout engines are called when document content nodes are encountered to determine the size of a pane sizes within the rectangular region. Once the pane sizes are determined for each content node, the content is rendered in each pane.

To render each pane, the pane size, alternate versions of content, and attributes of the content to be rendered are input into the system. Each version of text content is evaluated to find the best line breaking solution for each version of alternate content, providing a text breaking goodness score for each version. Each version of image content is also evaluated to find the best figure placement solution, providing a figure layout goodness score for each version of figure placement. The best combinations of alternate versions of text and figure content using a layout goodness score are based on the text line breaking and figure layout goodness scores. The text and figure combination with the best layout goodness score is then rendered in the pane.

The overall layout goodness score includes a constant value as a penalty for falling outside of the valid viewing range at all, and a weighted value proportional to how far outside of the range the parameter is. Thus, the overall layout goodness score is determined as the weighted value multiplied by distance outside of valid viewing range plus the aforementioned constant value for each content node.

In evaluating each version of image content to find the best figure placement solution, the figure layout goodness score for each version of figure placement is calculated by determining an approximate goodness score for each version of figure placement using an approximate text flow. Once all versions of figure placement have been tried, a more careful text formatting procedure is used to determine the goodness score for the best few versions of figure placement. The figure goodness score is in part determined by measuring distances between figures and the text that references them, and penalizing figures that do not fall on the same page as their reference. Additionally, a score is computed for the formatting of each line of text, the occurrence of any orphaned text or figures and compliance to any user preferences.

In evaluating each version of text content to find the best line breaking solution information about conflicting break points is recorded as the document tree is traversed. A minimum cumulative badness associated with the sub-problem of breaking the i-th partial paragraph is computed. The next to the last break in the i-th partial paragraph is then computed. Starting with the next to the last break in the i-th partial paragraph, the current set of previously computed breaks is backtracked to recover the actual set of breaks that achieve the minimum badness score. All of the words between breaks are then collected to determine the actual text for each line of paragraph.

DESCRIPTION OF THE DRAWINGS

The file of this patent contains at least one drawing executed in color. Copies of this patent or patent application publication with color drawing(s) will be provided by the U.S. Patent and Trademark Office upon request and payment of the necessary fee.

The specific features, aspects, and advantages of the present invention will become better understood with regard to the following description, appended claims, and accompanying drawings where:

FIGS. 15A, 15B and 15C show a magazine article shown in FIG. 15G laid out in wide-screen, letter and PDA displays.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
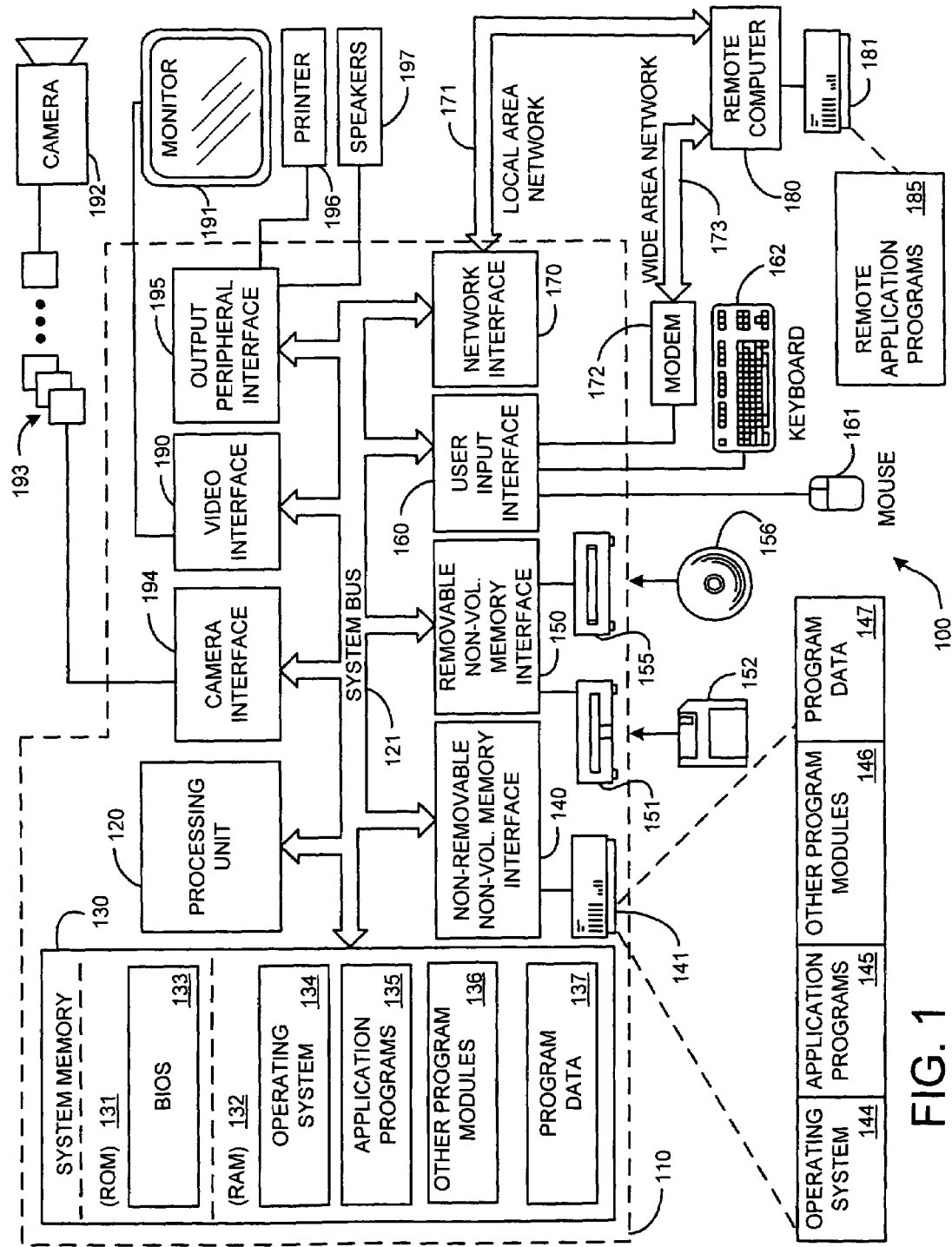
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Adaptive Document Layout System and Method.

In this section, the adaptive document layout system and method is described. Specifically, this section address the way document content and structure is represented. Additionally, the system and method of authoring documents via an exemplary Graphic User Interface (GUI), the document layout engine and a novel text-breaking algorithm are also discussed.

2.1 Document Content and Structure Representation

The term content is used to refer to any portion of a document—for example, a piece of text, an image, a set of HTML links, a set of formatting instructions, or any combination thereof. Content can be nested hierarchically, as in a figure that contains an associated caption. Manifold content refers to alternate versions of content.

2.1.1 Document Structure Overview

Figure 2:
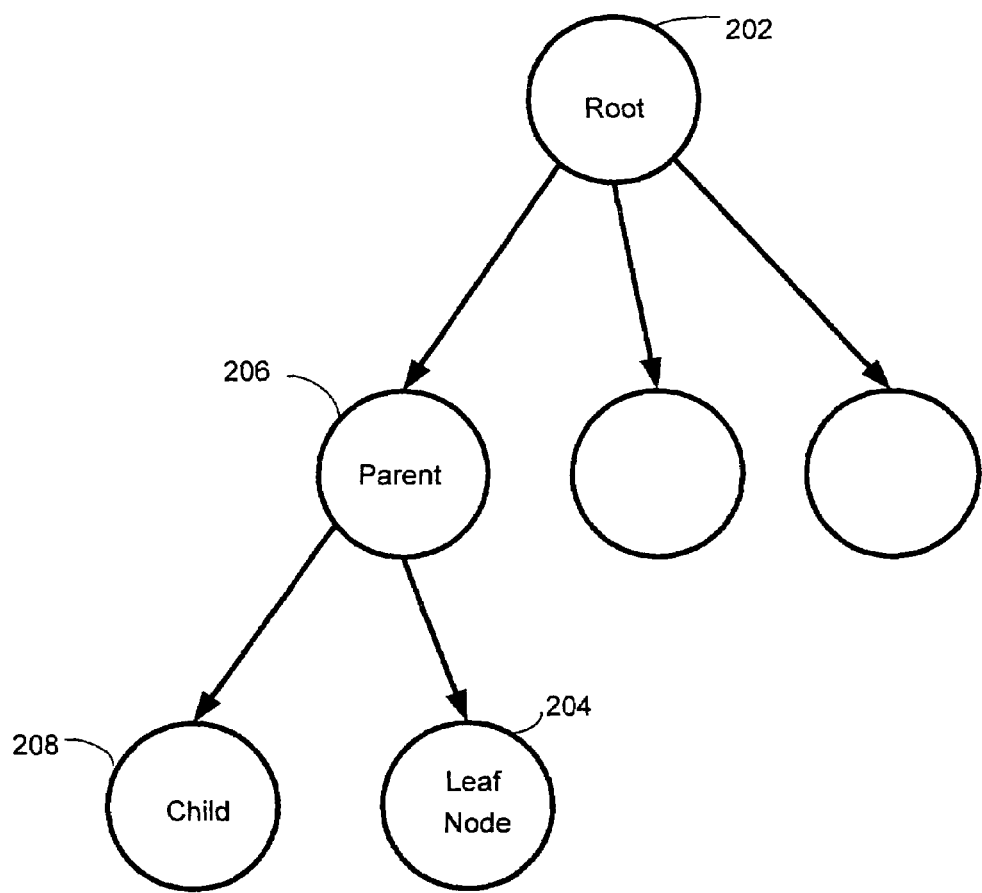
FIG. 2 is an example of a typical tree data structure.

To represent manifold content, a tree data structure, called the document tree, is used, as shown in FIG. 2. As typical, a tree data structure is accessed beginning at the root node 202 (the distinguished initial or fundamental item of a tree and the only item which has no parent). The tree is composed of nodes. Each node of the tree represents a unit of reference in the data structure, a collection of information that must be kept at a single memory location. Each node is either a leaf 204 (a terminal or "bottom" item of a tree, i.e., an item with no child) or an internal node 206. An internal node has one or more child nodes and is called the parent 206 of its child nodes 208. All children of the same node are siblings. Contrary to a physical tree, the root is usually depicted at the top of the structure, and the leaves are depicted at the bottom.

In the adaptive document system and method, for simplicity, the content itself is placed at the leaves of the tree. The internal, or structural, nodes of the tree are defined to be one of two kinds: OR nodes, which group together alternate versions of content; and AND nodes, which group together an arbitrary series of OR and content nodes. The document tree is rooted by an AND node, which, assuming a non-empty document, will contain one or more children. While AND nodes are not strictly necessary to represent alternate versions of content (i.e., OR nodes could instead be allowed to appear anywhere within a content node), it has been found that separating out the structural nodes explicitly, in this way, simplifies the editing algorithms, as described in the next section and the Appendix.

In practice, an XML file format is used to specify this document structure. XML provides a convenient syntax for organizing the set of nodes in the tree and optionally associating attributes with each node.

Since traditional documents do not include alternate representations of content, there is only one version of the entire document in these traditional documents. However, there can be many different versions of a multi-representation document corresponding to all combinations of its alternate content. Such versions are referred to as document views.

2.1.2 OR Nodes

Figure 3:
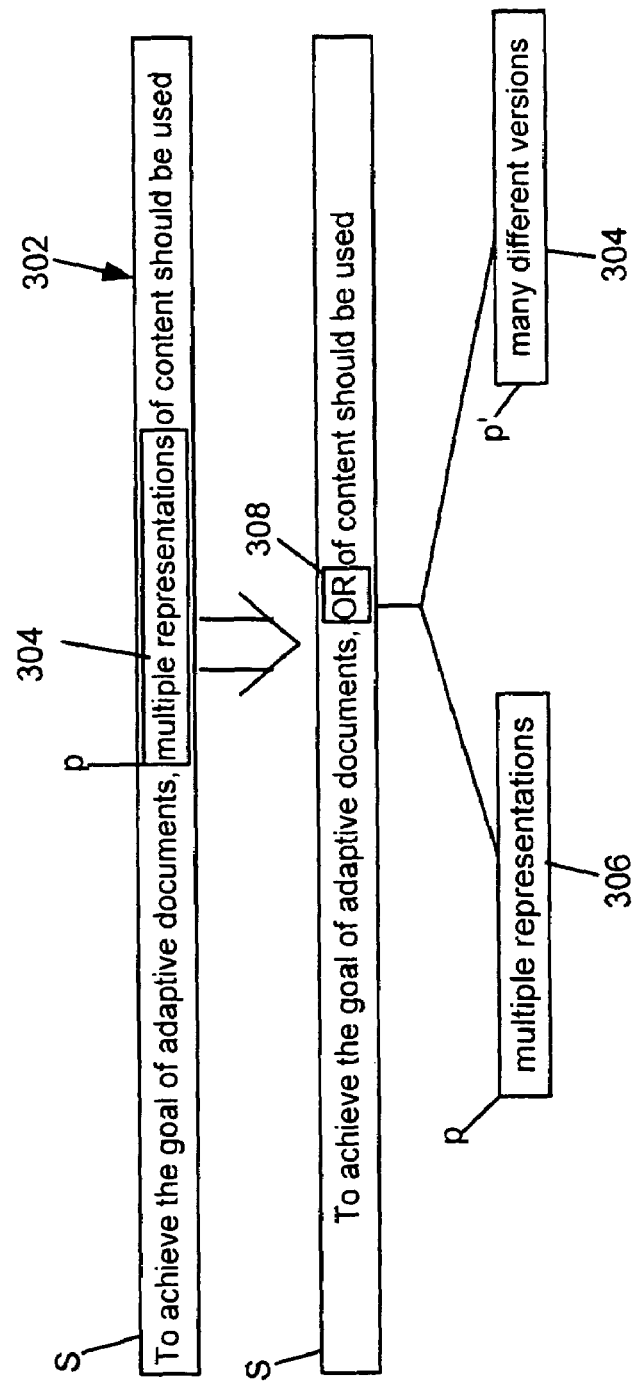
FIG. 3 is a diagram showing a first example of how document content is represented as a document tree.

FIG. 3 provides a diagram showing an example of how document content is represented as a document tree. Consider a "document" consisting of a single sentence, S 302. Supposing the document author specifies an alternate version p' 304 of a phrase p 306 contained within S 302. This new content is represented by replacing p with an OR node 308 whose children are p and p' (FIG. 3). An OR node groups together alternate versions of content. Thus, only one child of an OR node will appear in the document.

Figure 4:
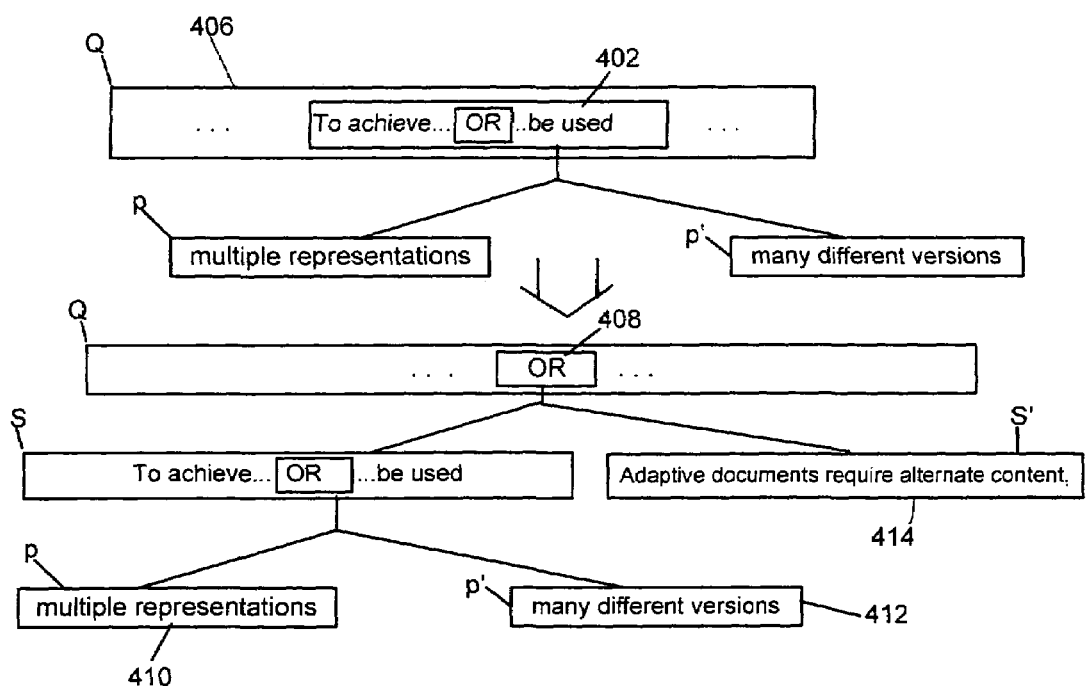
FIG. 4 is a diagram showing a second example of how document content is represented as a document tree.

Extending this example, as shown in FIG. 4, suppose S 402 is contained within paragraph Q 406. The author might want to specify a condensed version of S (called S') 414 that might be more appropriate when the document is viewed on a handheld device. This new content is represented by creating another OR node 408 whose children are S and S' (FIG. 4). Note that the S branch of the top-level OR contains the phrase-level OR node from before. Thus, depending on the viewing situation, either S or S' may be displayed. If S is chosen, then one of p 410 or p' 412 will be displayed.

It is easy to see how the tree structure used to represent this simple example can be used to handle a multi-representation document. Any piece of content that has multiple authored versions is represented with an OR node, and as in the example, the OR nodes can be nested. However, it is hypothesized that difficulties in grasping the meaning of highly nested alternate content will discourage authors from creating documents with deep structure. As a result, it is expected the average document tree to be wide rather than deep.

2.1.3 AND Nodes

Figure 5:
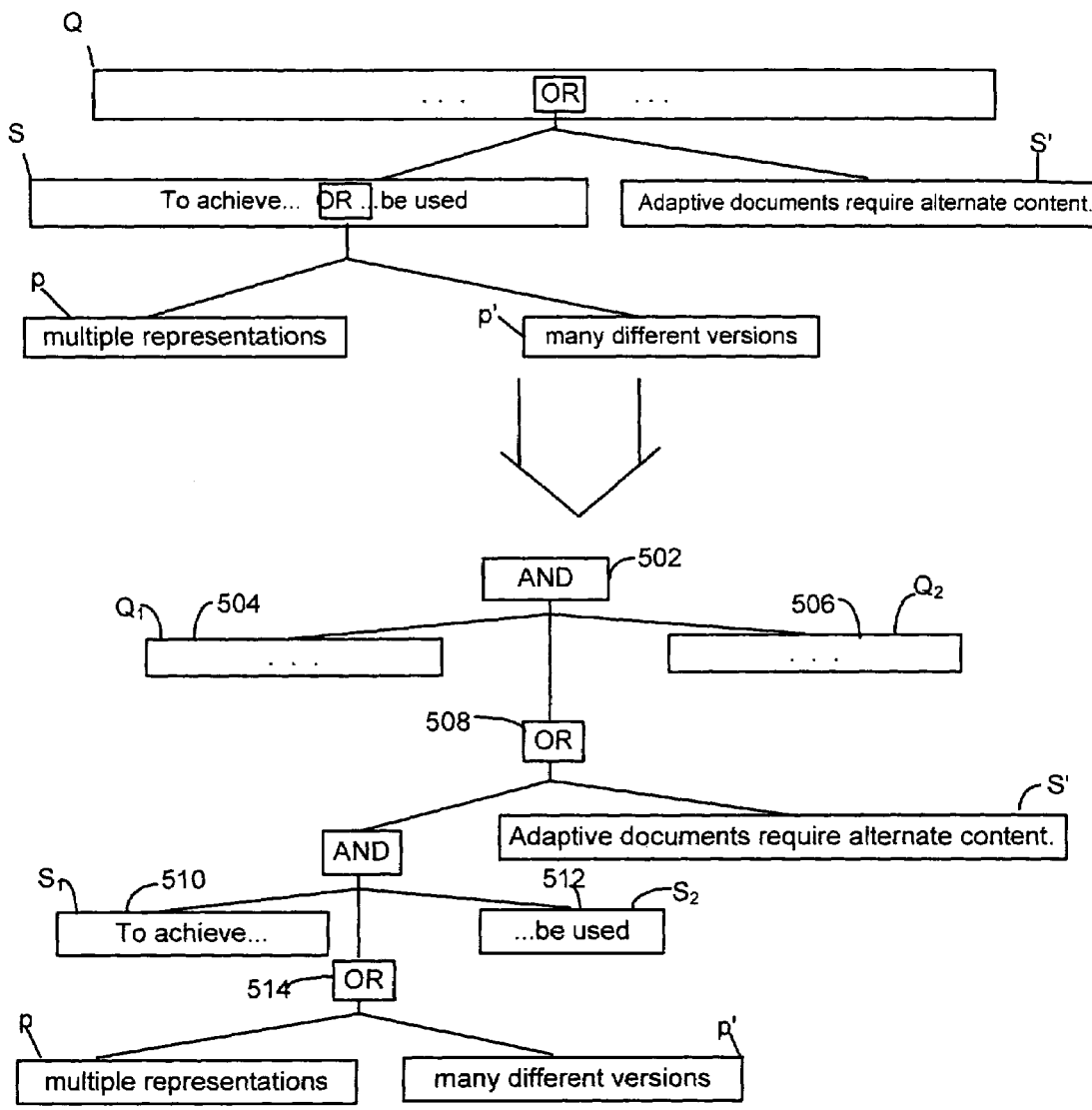
FIG. 5 is a diagram showing an example of how AND nodes are used to stitch together two contiguous pieces of content.

Although conceptually it is OR nodes that define the tree structure, in practice AND nodes are also incorporated to stitch together contiguous pieces of content. In contrast to OR nodes, an AND node's children all appear in a view of the document. FIG. 5 shows the actual tree for the running example, with one AND node 502 used to group the three components of sentence S. $Q_1$ 504 and $Q_2$ 506 correspond to the content preceding and following the sentence-level OR node 508, and $S_1$ 510 and $S_2$ 512 correspond to the content preceding and following the phrase-level OR node 514. Note that two or more content nodes will never be adjacent children of an AND node, since this is equivalent to a single node containing all of the content. In addition, AND nodes are only used to group different types.

2.1.4 Tree Equivalence and Valid Transformations

Figure 6:
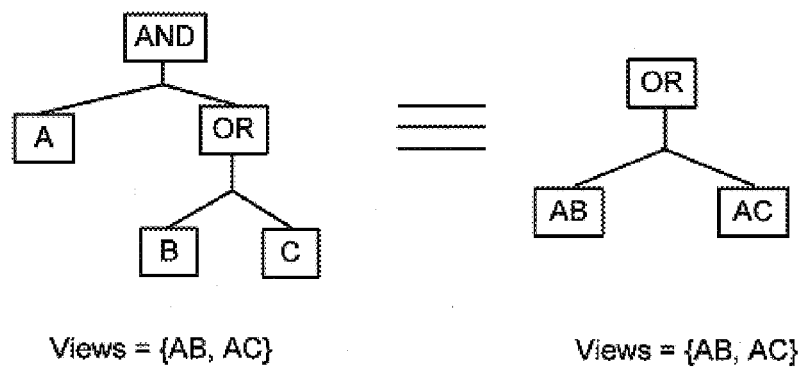
FIG. 6 is a diagram showing two equivalent document trees.

Two trees are considered equivalent if they can generate identical sets of document views, regardless of differences in structure. FIG. 6 shows an example of two equivalent trees whose nodes are organized differently. A transformation of one of the trees is considered valid as long as the resulting tree is equivalent to the original.

2.1.5 XML File Format

XML file format is used to specify the document structure discussed above. XML provides convenient syntax for organizing a set of nodes in a tree and storing attributes associated with each node. The following table indicates how documents are expressed in XML.

To represent AND and OR nodes, the token pairs <AND> . . . </AND> and <OR) . . . (/OR>, are used respectively. Each child of an OR node is placed between the <OR> and </OR> tokens and is denoted by the token pair <REP attributes> . . . </REP>. The attributes in the <REP> node are used to specify an arbitrary list of any special properties associated with the designated content, such as "summary version," "in-depth version," "large-type version," etc., which are used to inform the layout. <DIV> nodes are used to denote a collection of content that should be laid out in a rectangular, rather than in line, with other content (e.g., a sidebar). <DIV> nodes are handled much the same as images by the layout engine. Table 1 provides a correspondence between a tree element and XML content.

TABLE 1

Document Tree Elements and XML Syntax

| Element | XML Syntax |
| --- | --- |
| OR node | <OR>...</OR> |
| AND node | <AND>...</AND> |
| DIV node | <DIV>...</DIV> |
| rep node | <REP text>...</REP> |
| text node | <TEXT>...</TEXT> |
| image node | <IMG arc=filename\> |

2.2 Authoring

Given the above-described adaptive document content representation and document tree structure, authoring documents using these representations will now be discussed.

2.2.1 Overview

Manifold content is only useful if it can be authored easily and effectively. Indeed, one reasonable objection to the whole adaptive document layout approach might be that it sounds like too much work for authors to be expected to create not just one, but many possible versions of their document. However, with the right authoring tools, this approach is not necessarily so onerous. For one thing, in many cases, the author is already doing this kind of work—adapting a document for several different audiences, for instance, when preparing a journal article from an earlier conference paper. In this case, the adaptive document layout system and method could actually be used to help keep the different versions in synch, rather than having entirely separate documents that have to be maintained and updated in tandem. In addition, as already mentioned, authors commonly make small changes to a document in order to fix up various formatting problems—in this case, the system helps keep around all of the possible versions instead of discarding the earlier ones. Finally, while manifold content may not always be worth the cost, it is not difficult to imagine common situations in which a document—say, for example, some advertising copy—is written once for wide distribution over an electronic medium, and for which entering different versions of content is a minimal price to pay for the sake of a far greater visual impact.

Designing a tool for authoring adaptive documents presents three main challenges. The first difficulty is representing the document such that the user can both understand its tree structure (or more specifically, what alternate content has been defined) and maintain a coherent view of the document. Clearly, it is important for the author to know which content has alternate versions and what those alternate versions are. At the same time, presenting a coherent view of the content allows the author to see how the document reads and provides a context for editing. The second challenge is designing an intuitive interaction model that allows the user to edit content and specify alternate versions. In other words, the authoring tool must enable the user to modify the document tree. Finally, the system should assist the author by suggesting where alternate content could be added to improve layout for some display size. Since it is impractical for the user to manually preview and evaluate a document under a wide range of viewing situations, the authoring tool should help the user accomplish the task in a reasonable way.

2.2.2 The Authoring User Interface/Document Editor

Figure 7:
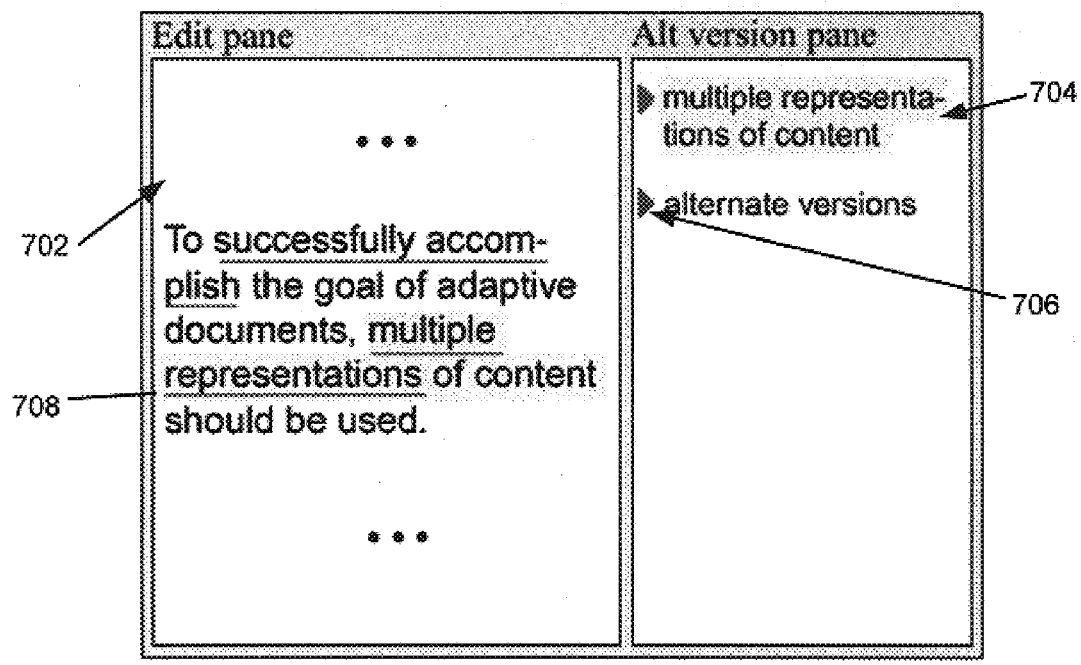
FIG. 7 is a stylized representation of the authoring tool's user interface.

The basic approach to the authoring user interface is to hide most of the document's structure at any given time and allow the user to interact with what appears to be, at first glance, just a single, linear view of the document. The authoring user interface is composed of two regions, as shown in FIG. 7. The large pane on the left is the edit pane 702, in which the linear view of the document appears. The narrower one on the right is the alternate version pane (also referred to as the alt version pane) 704, in which all versions of the currently selected manifold region of the document are shown. Each of these two regions includes some visual cues to help the user understand the underlying structure, the current selection state and what interactions are permitted.

2.2.2.1 The Edit Pane

Figure 8:
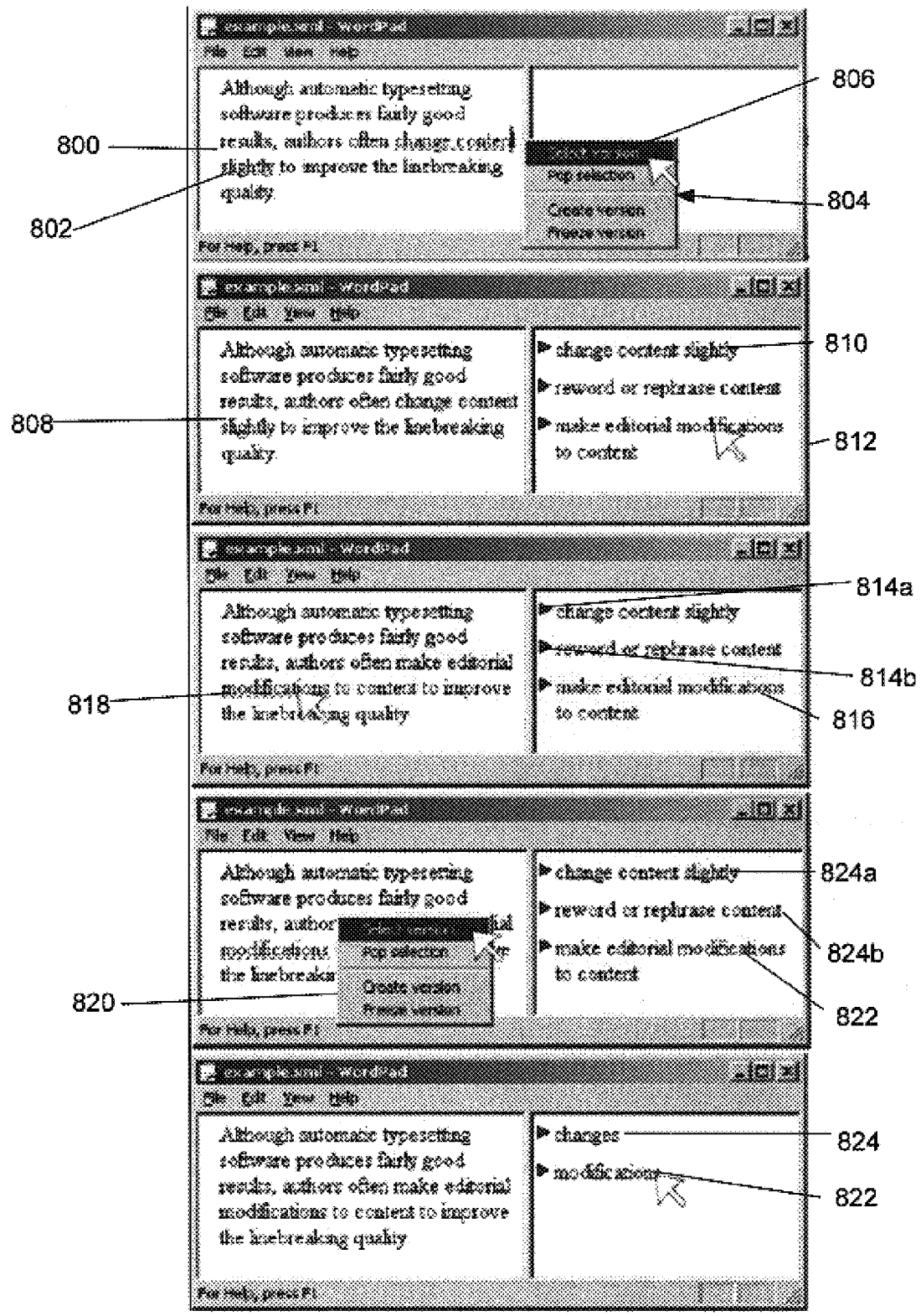
FIG. 8 depicts a series of images of the UI for one working embodiment of the adaptive document layout system and editing interface.

Referring now to FIG. 8 for one exemplary working embodiment of the adaptive layout system and method, areas of manifold content within the edit pane 800 displaying the document are indicated by a faint, purple, dotted line 802 beneath that portion of the content. Hovering over an area of manifold content with an input device such as a mouse pointer brings up a small menu 804 with several editing choices. One choice is to "select" 806 the version of content beneath the cursor, in which case the content becomes highlighted in yellow 808 and also appears (also highlighted in yellow) 810 in the separate, alternate-version pane 812, to the right side of the edit pane 800, along with all other (unhighlighted) versions of the content 814a, 814b. Once a version of content is selected, any regions of manifold content within that selection are now indicated with the purple dotted line 818. (These correspond to OR nodes that are children of the selected content. Since OR nodes can be nested, manifold regions can also be nested. This means that a given piece of content may belong to a nested collection of manifold regions corresponding to a nested collection of OR nodes in the document tree.) If any one of these regions is selected 820, it and its alternate versions 824 will replace their parent in the alternate-version pane 812. Right-clicking using an input device, such as a mouse, in either pane reveals a menu indicating the available operations for the content beneath the cursor.

Figure 9:
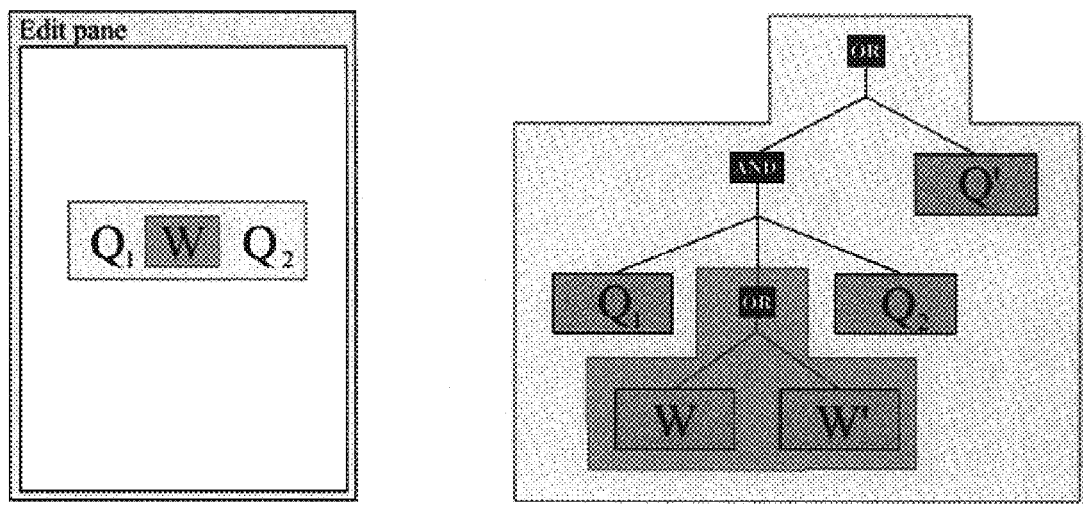
FIG. 9 depicts how a word W appears in an edit pane of a UI.

FIG. 9 indicates how a word W that appears in the edit pane can be part of two different manifold regions. Thus, if one tried to underline every different manifold region in the document, some content (such as W) would have to be underlined more than once. Furthermore, selecting a particular manifold region might be difficult, since clicking on a multiple underlined piece of content would identify more than one candidate manifold region to be selected.

Partly because of these issues and partly in an attempt to avoid over cluttering the interface of the system, in one working embodiment, every manifold region in the document is not underlined. Instead, in this embodiment, the following set of rules is used for visualizing and selecting manifold regions.

1. In the selected OR node's visible sub-tree, only the highest-level OR nodes are underlined.

2. In the rest of the tree, only the highest level visible OR nodes that are not direct ancestors of the selected node are underlined.

3. The user can change the current selection by picking an underlined manifold region to select or "popping up" to the first ancestor OR node of the current selection. These two options are available on the pop-up menu that appears when the author right-clicks in the edit pane.

2.2.2.2 The Alternate Version (Alt Version) Pane

Figure 10:
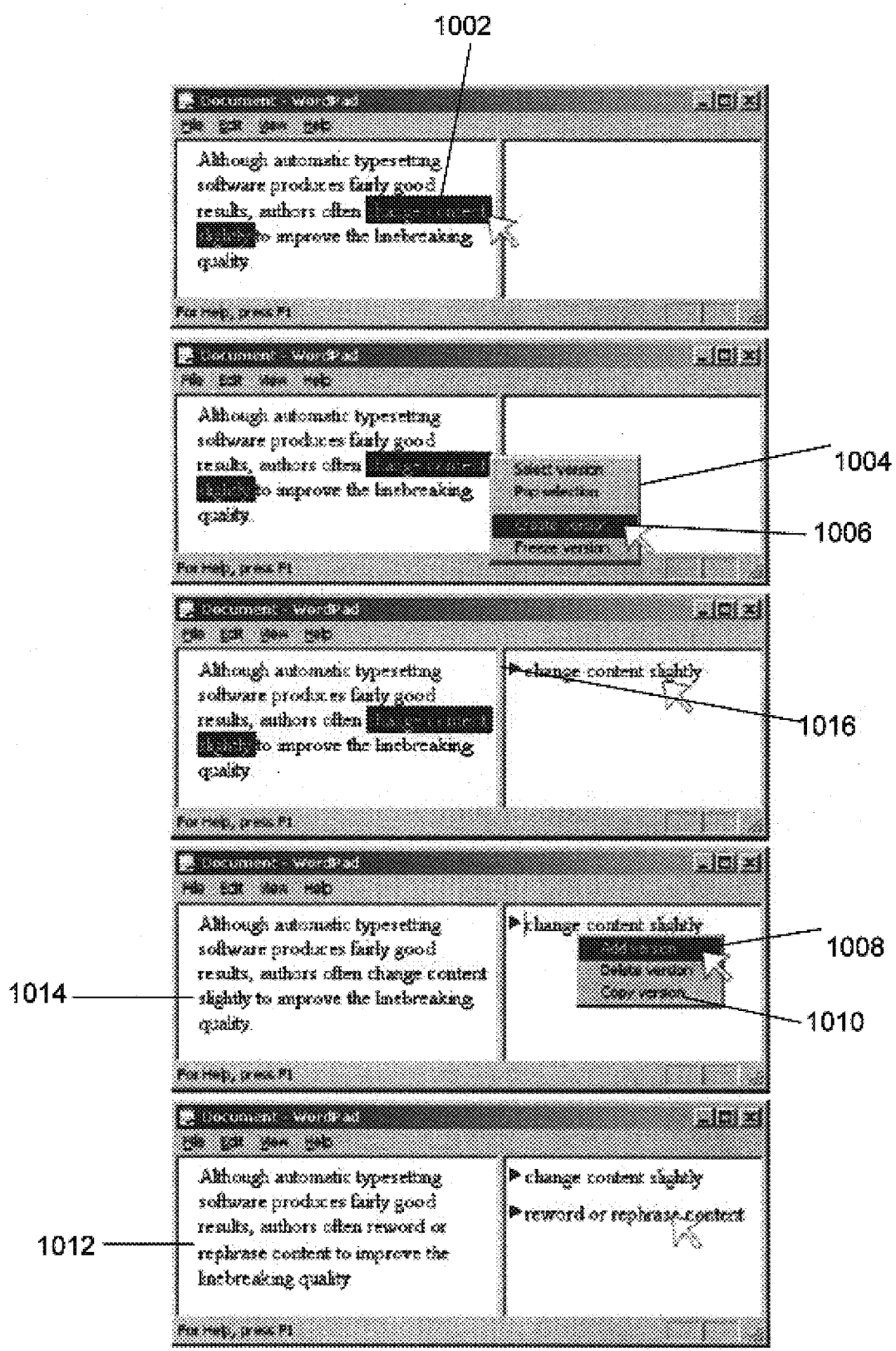
FIG. 10 shows a series of images of the graphic user interface of one exemplary working embodiment of the adaptive document layout system and process wherein a new region of manifold content is created.

As shown in FIG. 10, as discussed previously, in the alt version pane, the alternate versions of the currently selected manifold region appear, with the version visible in the edit pane highlighted in yellow 1014. The user can change the visible version by clicking using an input device on any of the alternate content. In one embodiment, a triangle 1016 is drawn in the left margin to indicate each alternate version. The alt version pane allows the user to perform at least four different operations on the selected manifold regions of alternate content. These are:

Add Version: The "Add Version" operation adds an empty alternate version to the selected OR node. A red triangle with no corresponding text is rendered to indicate the newly added version.

Delete Version: The "Delete Version" operation removes the currently highlighted version from the selected OR node. The next version in sequential order is highlighted and becomes the visible piece of content. If there are no versions left after the deletion, the OR node is removed from the document tree and selection automatically pops back and up one level.

Copy Version: The "Copy Version" operation adds a duplicate of the currently highlighted version to the selected OR node. This operation copies the entire sub-tree corresponding to the highlighted version. Thus, any nested alternate content is preserved in the new version.

Copy Version Special: The "Copy Version Special" operation copies the currently highlighted version, but does not preserve its underlying structure. That is, nested manifold regions within the source version are not duplicated. Only the content currently visible in the alt version pane is copied and added as a new alternate version.

2.2.2.3 Editing Text and Images

At any given time, the author is always free to edit any piece of text that appears in either pane. In addition, the author can select alternate versions of content by simply clicking on the selection in the alternate-version pane, in which case this version becomes highlighted and also replaces the version currently appearing in the edit pane. In this way, by focusing on the edit pane, the author can get a good sense of how the selected version reads, or appears, alongside the other content in the document, without the distraction of any of its alternate versions. As shown in FIG. 10, the author can also create new manifold content in the alternate-version pane by selecting text to be configured into multiple versions 1002 and bringing up a pop-up menu 1004. The author can create new manifold content either by adding a new entry from scratch 1008 or by copying an existing version 1010. To return to a version of alternate content that contains the selected version, the author can "pop the selection" (one of the menu choices), or just click outside of the selected version in the edit pane to see all of the highest-level areas 1012 of manifold content again.

Both of the authoring system UI panes provide standard text editing functionality, with basic formatting operations for selecting font type, font size and style. In addition, the user can specify where in the document to insert image files that are identified by circular icons located in line with the text. Backspacing over an icon removes the corresponding image, and to view an image file in a separate window, the author can right-click on an icon and choose View Image from the menu.

2.2.3 Modifying the Document Tree

Most editing operations in the UI are supported by straight forward transformations of the document tree.

2.2.3.1 Overview.

In addition to adding, deleting and modifying alternate content for existing manifold regions, the system provides a way to create new manifold regions.

Creating a new version for an existing region of manifold content is just a matter of adding a new child to the corresponding OR node in the document tree. Deleting or editing versions of content are similarly straightforward. Deleting an existing region of manifold content is just a matter of deleting a child from the corresponding OR node in the tree. When editing a region of manifold content the old manifold content is simply replaced with the newly edited content.

Figure 11:
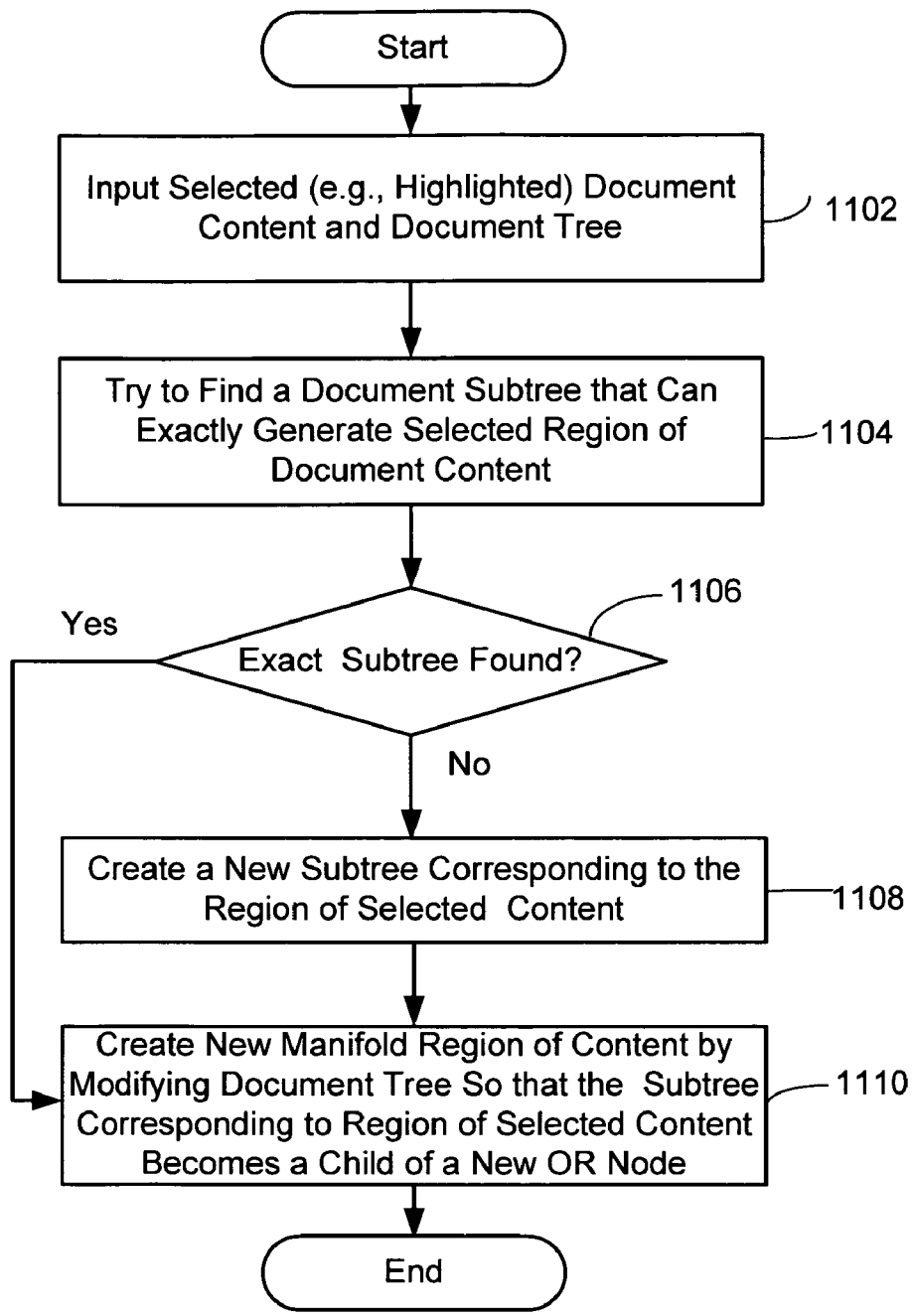
FIG. 11 is a flow diagram depicting the general process actions of creating a region of manifold content.

Slightly more complex is the transformation to create a new region of manifold content—the content node containing the selection must be split into three nodes underneath a new AND node: the portion to the left of the selected content, a new OR node containing a child for the selected region, and the portion to the right of the selected content. The general process of creating a new region of manifold content is shown in FIG. 11. The selected document content and document tree are input (process action 1102). An attempt is made to find a document sub-tree that can exactly generate the region of selected document content (process action 1104). If the exact sub-tree is not found (process action 1106), a new sub-tree corresponding to the region of selected content is created (process action 1108). Once the exact sub-tree corresponding to the selected document content is found or created, a new region of manifold content is created by modifying the document tree so that the sub-tree corresponding to the region of selected content becomes a child of a new OR node (process action 1110). This new OR node is combined under an AND node with the content before the selected content and the content after the selected content.

The most complicated operation involves the possible selection of a new region of manifold content that spans several existing manifold content regions—and, in the worst case, intersects them in some arbitrary way. The procedure for creating non-heirarchial manifold content basically involves making a series of recursive transformations on the document tree, "pushing" AND nodes down through OR nodes, in order to transform the tree from its initial representation to an equivalent one in which all of the selected content appears together beneath a single AND node. A new OR node is then rooted at that spot to accommodate the new alternate content.

Details of the procedure for modifying the document tree for creating new areas of manifold content are provided in the Appendix, Section 4.1.

2.4 Layout Engine

With the benefit of manifold content, attractive text and page layout becomes much easier. In this section, the basic adaptive document layout engine is described, focusing particularly on the parts of the approach that are leveraged by manifold content.

2.4.1 Overview

Figure 12:
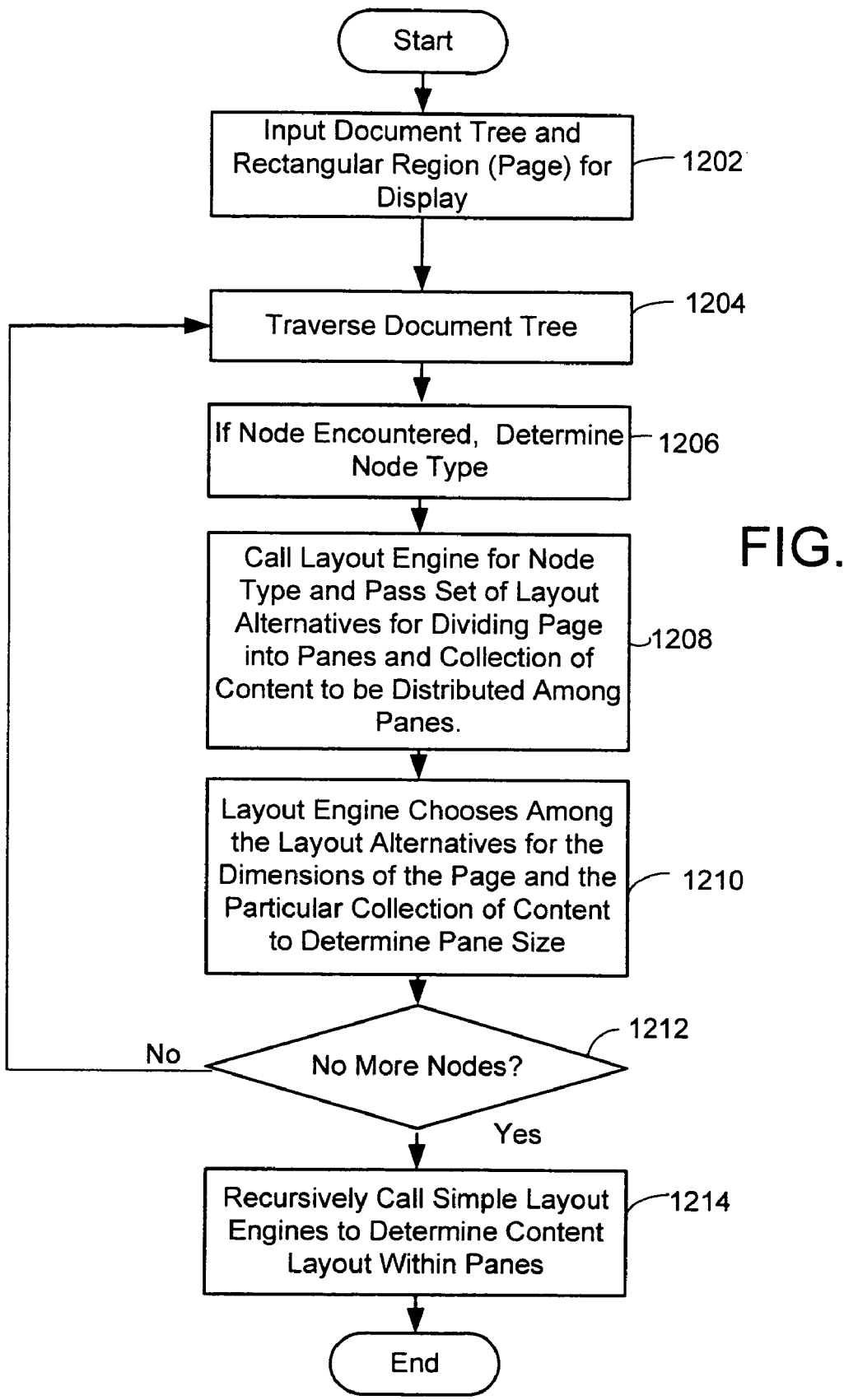
FIG. 12 is a flow diagram depicting the process actions of the composite page layout engine.

In the most general sense, as shown in FIG. 12, the input to the layout procedure is a document tree and a rectangular region, or page, for display. The tree is traversed. As content nodes of different specific types are encountered, calls are made to an appropriate layout engine to determine the size of the panes within a page. Once the pane sizes are determined, the portion of the document represented by the content node is rendered in each pane.

Currently, two types of layout engines are supported in one working embodiment of the adaptive document layout system: a composite-page layout engine, and a simple-page layout engine. It should be noted, however, that various layout engines could be used to execute the various layout tasks.

2.4.2 Composite Page Layout Engine

The composite-page layout engine is responsible for the overall structure for the rectangular region it is passed. In other words, it is responsible for determining the pane sizes within a page.

Specifically, referring to FIG. 12, the document tree and rectangular region (page) available for displaying content are input (process action 1202). The tree is traversed (process action 1204). When a content node is encountered, the node type is determined, a composite layout engine for this node type is called, and the content node that caused this engine to be called designates a set of alternative ways of dividing up the page into panes (preferably specified via XSL templates) and provides a collection of named content that is distributed among the different panes (process actions 1206, 1208). The layout engine chooses among the different layout alternatives according to the dimensions of the rectangular region it is passed and the particular collection of content in the node, as shown in process action 1210. For instance, if the rectangle is tall and skinny, then the panes might be laid out vertically, whereas if it is short and wide, the engine might choose a horizontal layout instead. Once all nodes have been encountered, the simple layout engines for the various pieces of named content are then called recursively in each pane (process actions 1212 and 1214). Within a pane, the simple-page layout algorithm is responsible for laying out the various primitive elements like figures and text.

2.4.2 Simple Page Layout Engine

The following paragraphs describe how the simple layout engine determines which piece of content to use if there are several versions. This description is followed by a description of a working embodiment of this layout engine.

Figure 13:
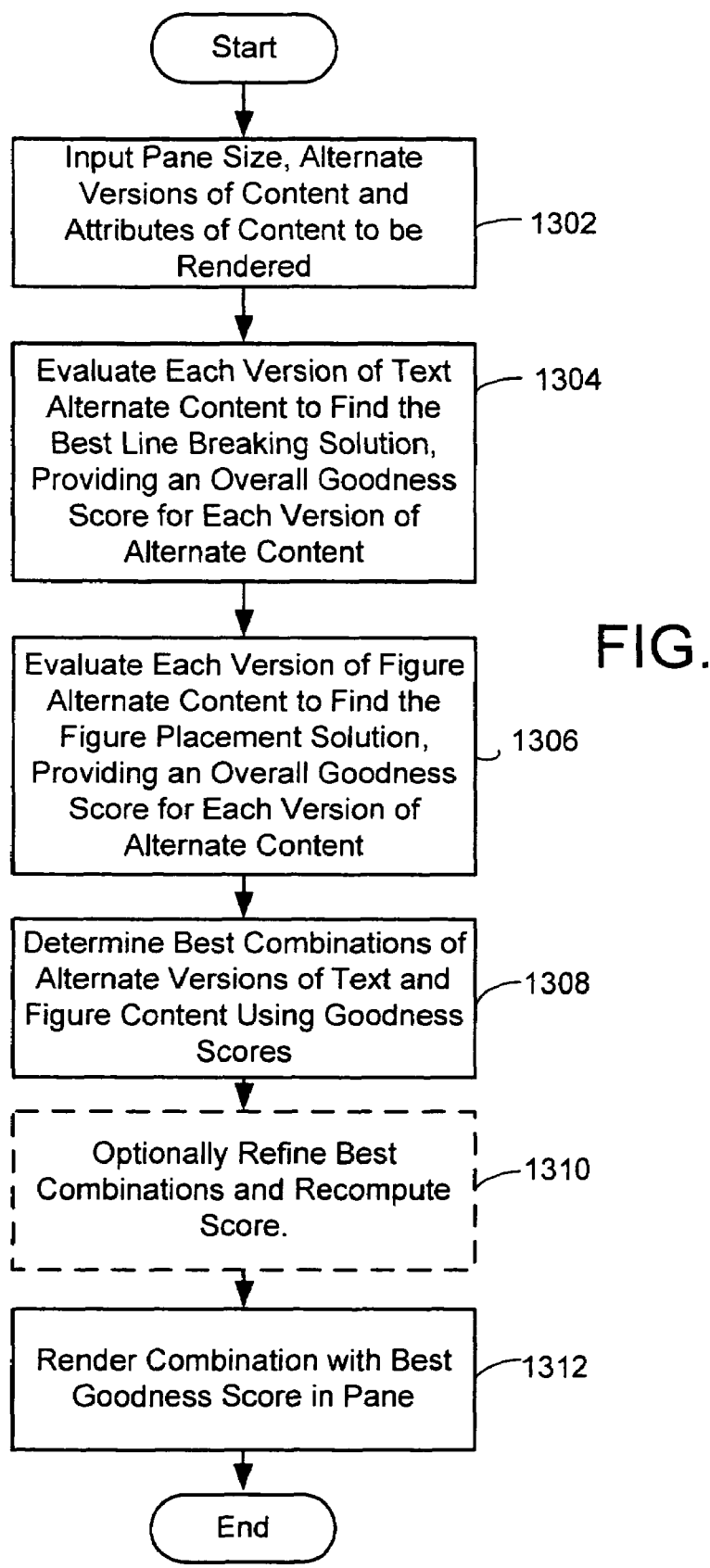
FIG. 13 is a flow diagram depicting the process actions of the simple layout engine.

Generally, the simple layout engine works as depicted in FIG. 13. The pane size, alternate versions of content, and attributes of the content to be rendered are input (process action 1302). Each version of text content is evaluated to find the best line breaking solution for each version of alternate content, providing a goodness score for each version (process action 1304). Additionally, each version of image or figure content is also evaluated to find the best figure placement solution, providing a goodness score for each version of figure placement (process action 1306). The best combinations of alternate versions of text and figure content are then determined using the previously determined goodness scores (process action 1308). Optionally, the results for the best combinations can be refined, and the goodness scores can be recomputed (process action 1310). The combination with the best layout goodness score is then rendered in the pane.

The general workings of the simple layout engine having been described, the following paragraphs provide additional information on text line-breaking evaluation and figure placement.

2.4.2.1 Manifold Text Formatting

To format paragraphs of text, a modified form of Knuth's dynamic-programming-based text-formatting algorithm [8] is used. The original algorithm takes as input a paragraph of text and first determines a set of potential break points $B=\{b_1, b_2, \ldots, b_n\}$. This set includes all inter-word spaces as well as legal hyphenation positions within words. Knuth's algorithm uses dynamic programming to find, in $O(m)$ time, the set of breaks $Bo \subseteq B$ that results in the best paragraph, as determined by some measure of goodness. For justified text, this measure simply considers how well each line of text fits into the available space.

In general, to incorporate alternate versions, additional break points are simply included in B that correspond to the various wordings specified in each OR node of the document tree. A small amount of extra bookkeeping is necessary to ensure a solution that does not include conflicting pieces of content (i.e., two pieces of content in different child sub-trees of a common OR ancestor). With these modifications, the procedure will find the best line-breaking solution over all choices of content. Thus, depending on the size and shape of the region into which the text must flow, the system may choose different versions of content to optimize the line-breaking quality. (Note that the more naive approach of trying all combinations of alternate content results in an algorithm, by contrast, that is exponential in the number of OR nodes within the paragraph.)

Figure 14:
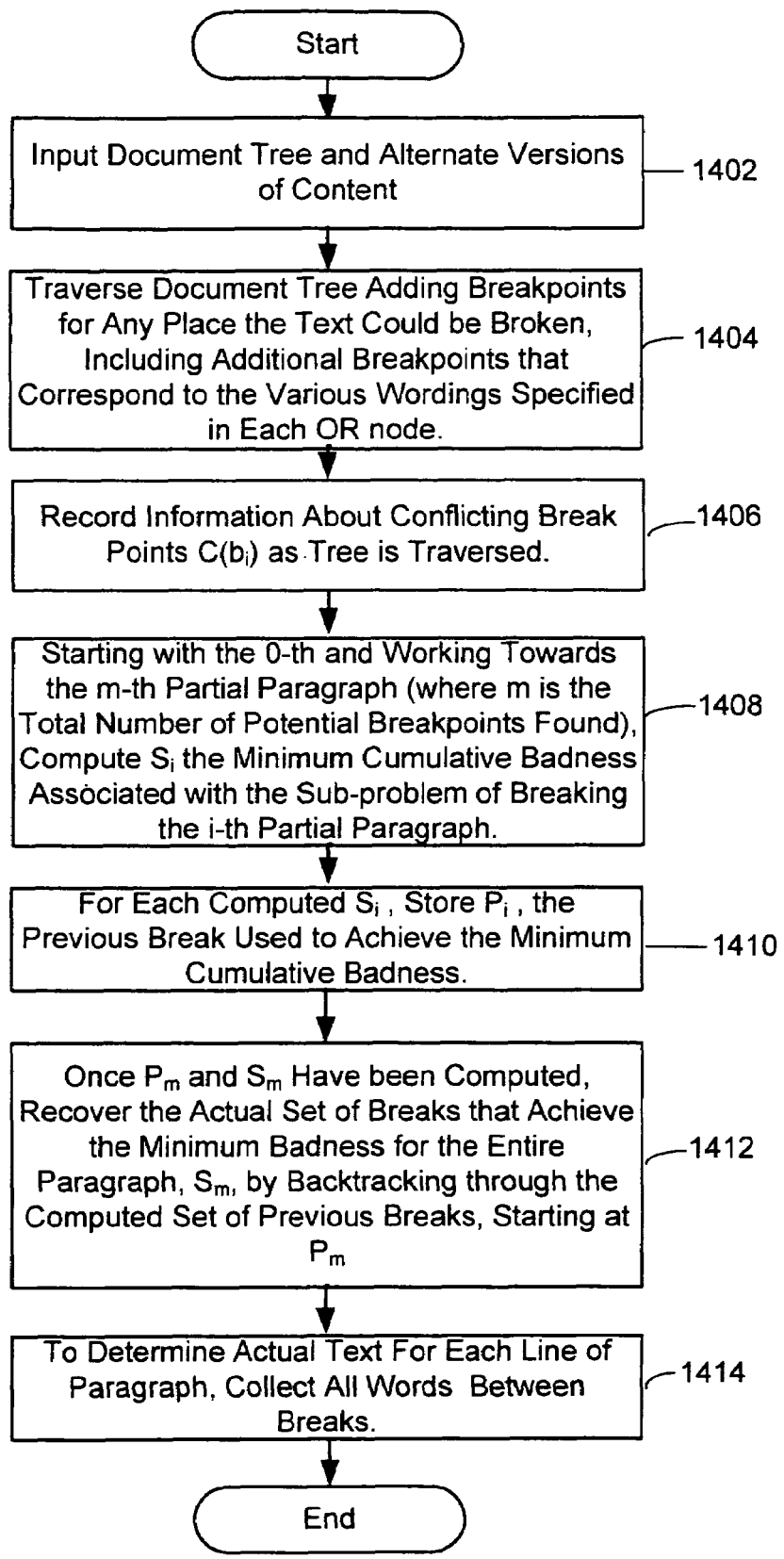
FIG. 14 is a flow diagram depicting the general process actions of a text breaking algorithm.

FIG. 14 provides a general depiction of the process actions of the text-breaking algorithm of the invention. The document tree and alternate versions of content are input (process action 1402). The document tree is traversed and breakpoints are recorded for any place that the text could be broken (e.g., between words and also between potential hyphenation points within words.), including additional breakpoints that correspond to the various wordings specified in each OR node (process action 1404). As the tree is traversed, information about conflicting breakpoints is recorded (process action 1406). The content up to break point i is referred to as the i-th partial paragraph. Starting with the 0-th and working towards the m-th partial paragraph (where m is the total number of potential breakpoints found in process action 1404), $S_i$, the minimum cumulative badness associated with the sub-problem of breaking the i-th partial paragraph is computed (process action 1408). These scores must be computed in order because the computation for the i-th partial paragraph depends on the scores computed for the 0-th through (i−1)-th partial paragraphs. For each computed $S_i$, $P_i$, the previous break used to achieve the minimum cumulative badness is also stored (process action 1410). Once $P_m$ and $S_m$ have been computed, the actual set of breaks that achieve the minimum badness for the entire paragraph, $S_m$, are recovered by backtracking through the computed set of previous breaks, starting at $P_m$ (process action 1412). To determine the actual text for each line of paragraph, all of the words between the breaks are collected (process action 1414).

More detailed information on the text breaking procedure used is provided in the Appendix, Section 4.2.

It should be noted that any conventional text-breaking algorithm can be used for foregoing text breaking procedure in the present adaptive document layout system and method.

2.4.2.2 Placing Manifold Figures

A simple, brute-force approach, by contrast, is used for selecting among manifold (floating) figures and placing them onto the page. For each alternative figure, a score for the approximate "goodness" (or a penalty score) of the page layout incorporating that figure is computed. In a preferred embodiment, when doing this, an approximate text flow is used in order to make this computation fast, since it may be performed many times to try all combinations. Once all combinations have been tried, a more careful metric for the best few combinations can be computed, using the "optimal" paragraph text-formatting procedure just described.

The metric for measuring the "goodness" of a page involves measuring distances between figures and the text that references them, and penalizing figures that do not fall on the same page as their reference. In addition, a score is computed for each for the formatting of each line of text. Additional penalties are added for any widows or orphans. There are also parts of the metric that the page designer can tune according to the document's style—metrics that prefer small or large figures, for example, or figures that together consume a certain proportion of the page.

2.4.3 Exemplary Working Embodiment of Layout Engine

The following paragraphs provide a working embodiment of a layout engine of the Adaptive Document Layout System and Method.

2.4.3.1 Document Representation

As discussed previously, adaptive layout documents use a simple XML format, with two new elements added to allow for multiple versions of content:

<OR> elements: These contain the different versions of a piece of content.

<REP> elements: These contain a single version of content. A number of these are inside an <OR> element, one for each version of the content.

Here is an example of two versions of an image, in the representation:

```
<OR>
  <REP>
    <IMG src="image1.jpg"/>
  </REP>
  <REP>
    <IMG src="image2.jpg"/>
  </REP>
</OR>
```

The <REP> elements may have attributes to indicate which versions are better suited for a particular viewing situation. Attributes are added to XML elements by enclosing them inside the element tag:

<REP attribute1=value1 attribute2=value2 . . . >

2.4.3.2 Attributes Used by the Layout Engine

There are a number of attributes an author can use to indicate to the layout engine when it should choose one version of some content over another. For example, the author might want a small, cropped image when a document is displayed on a very small screen, and a larger version of the image when shown on a wide screen. This preference is encoded in the document by using adding attributes to the <REP> elements for each of the versions of the image. For the above example, the small image could specify a maximum page width of 400 pixels, which would tell the layout engine that this version is not appropriate for pages over 400 pixels wide. One way this could be expressed using XML format follows (the meanings of the pageSizeBias and pageSizeWeight attributes will be explained later):

```
<OR>
  <REP maxPageWidth=400 pageSizeBias=100 pageSizeWeight=1>
    <IMG src="small.jpg"/>
  </REP>
  <REP minPageWidth=400 pageSizeBias=100 pageSizeWeight=1>
    <IMG src="big.jpg"/>
  </REP>
</OR>
```

A complete list of attributes and their meanings for this working embodiment is provided in later paragraphs.

2.4.3.3 Scoring of the Versions

When the layout engine is actually placing content on the page, it needs a way to use these attributes to choose one version or another depending on the viewing situation. This is done through a scoring mechanism, where the attributes are evaluated for each version of content, providing a penalty (or score) for each. The version with the lowest penalty (or alternately highest goodness score) wins, and is placed on the page. Generally, a penalty is given to a version of content if the viewing parameters (e.g. page width) fall outside of the range given by the <REP> element. The penalty usually contains two terms, a constant value as a penalty for falling outside of the legal range at all, as well as a (weighted) value proportional to how far outside of the range the parameter is. So, the penalty=weight*(distance outside valid range)+bias. Here, using a simple example at two different page widths, the penalties for each version are computed:

```
<OR>
  <REP maxPageWidth=400 pageSizeBias=100 pageSizeWeight=1>
    <IMG src="small.jpg"/>
  </REP>
  <REP minPageWidth=400 pageSizeBias=100 pageSizeWeight=1>
    <IMG src="big.jpg"/>
  </REP>
</OR>
```

If this were being laid out on a page with a width of 800, it would compute the following scores:

rep 1 (small.jpg): since page width>maxPageWidth, penalty is:

abs(page width−maxPageWidth)*pageSizeWeight+pageSizeBias=400*1+100=500 rep 2 (big.jpg): since the page width isn't outside of the acceptable bounds, the penalty is 0

In this case, rep 2 would be chosen.

If the page width were 300 instead, the penalties would be:

rep 1: 0 rep 2: 100*1+100=200

Here, rep 1 would be chosen.

2.4.4.3 Full List of Attributes and Scoring for this Exemplary Working Embodiment A complete list of the attributes used for choosing content used in this one working embodiment of the invention is provided in the following tables. The attributes whose names end in "Weight" or "Bias" are used to compute the penalties for violating the other attributes.

TABLE 2

Attributes Concerning Page Size

| | |
|---|---|
| minPageWidth | If page width < minPageWidth:<br>penalty = abs(minPageWidth-page width)*pageSizeWeight + pageSizeBias |
| maxPageWidth | If page width > maxPageWidth:<br>penalty = abs(maxPageWidth-page width)*pageSizeWeight + pageSizeBias |
| minPageHeight | If page height < minPageHeight:<br>penalty = abs(minPageHeight-page height)*pageSizeWeight + pageSizeBias |
| maxPageHeight | If page height > maxPageHeight:<br>penalty = abs(maxPageHeight-page height)*pageSizeWieght + pageSizeBias |
| pageSizeWeight | (used above) |
| pageSizeBias | (used above) |

TABLE 3

Attributes Concerning Column Size

| | |
|---|---|
| minColumnWidth | If column width < minColumnWidth:<br>penalty = abs(minColumnWidth-column width)*colSizeWeight + colSizeBias |
| maxColumnWidth | If column width > maxColumnWidth:<br>penalty = abs(minColumnWidth-column width)*colSizeWeight + colSizeBias |

TABLE 3-continued

Attributes Concerning Column Size

| | |
|---|---|
| colSizeWeight | (used above) |
| colSizeBias | (used above) |

TABLE 4

Attributes Concerning Page Coverage (Coverage is the Fraction of the Page that the Figure Occupies)

| | |
|---|---|
| minCoverage | If coverage < minCoverage:<br>penalty = abs(minCoverage-coverage)*coverageWeight |
| maxCoverage | If coverage > maxCoverage:<br>penalty = abs(maxCoverage-coverage)*coverage Weight |
| minVertCoverage | If vertical coverage < minVertCoverage:<br>penalty = abs(minVertCoverage-vertical coverage)*coverageWeight |
| maxVertCoverage | If vertical coverage > maxVertCoverage:<br>penalty = abs(maxVertCoverage-vertical coverage)*coverageWeight |
| minHorizCoverage | If horizontal coverage < minHorizCoverage:<br>penalty = abs(minHorizCoverage-horizontal coverage)*coverageWeight |
| maxHorizCoverage | If horizontal coverage < maxHorizCoverage:<br>penalty = abs(maxHorizCoverage-horizontal coverage)*coverageWeight |
| coverageWeight | (used above) |

TABLE 5

Attributes Concerning Figure Size

| | |
|---|---|
| minWidth | If figure width < minWidth:<br>penalty = abs(minWidth-figure width)*figSizeWeight + figSizeBias |
| maxWidth | If figure width > maxWidth:<br>penalty = abs(maxWidth-figure width)*figSizeWeight + figSizeBias |
| figSizeWeight | (used above) |
| figSizeBias | (used above) |

3.0 Results

Figure 15G:
FIG. 15G shows an image of the original print version of the magazine article depicted in FIGS. 15A through 15F.
Figure 15D:
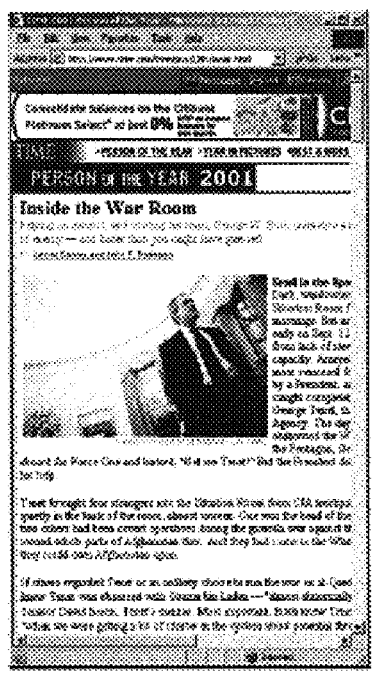
FIGS. 15D, 15E and 15F show a sequence of images of the HTML version of the print version of the magazine article shown in FIG. 15G at varying window widths.
Figure 15E:
Figure 15F:
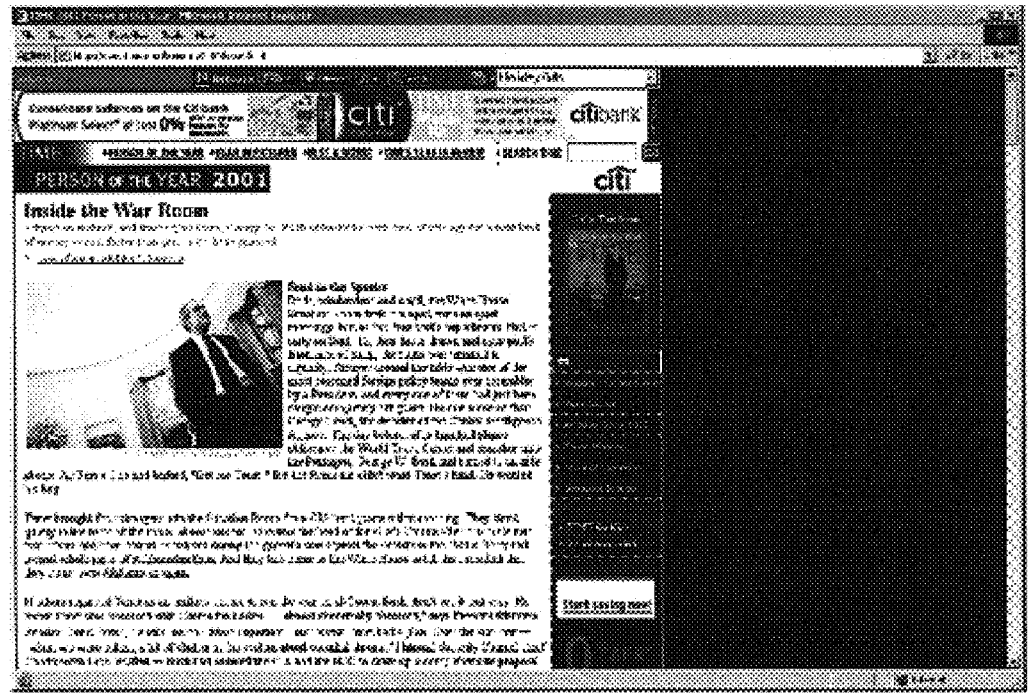

To evaluate the adaptive document layout system and method, some simple manifold-content versions of a real magazine article were used. To simulate viewing on various displays, the article was laid out at different window sizes using the adaptive document layout system and method. FIGS. 15A, 15B, 15C show the first article laid out for widescreen, letter, and PDA displays. For comparison, a scan of the original paper document has been included (see FIG. 15G), in addition to the actual web versions of the documents as they appear today (FIGS. 15D, 15E and 15F).

Note how the layout engine chooses different content to optimize the layout for the different displays. In the letter-sized display of the article, the layout engine automatically selects a cropped version of the image that appears in the wide-screen layout. In this case, it has been specified in the style sheet for the page a certain desired coverage of the page by images. Since the cropped image comes closer to meeting the desired coverage than the original image (as it would appear if it were scaled to fit on the screen), the layout algorithm opts for the cropped version. Also, note how on the PDA-sized display the layout engine automatically chooses a smaller title that also does not include a teaser paragraph.

Figure 16A:
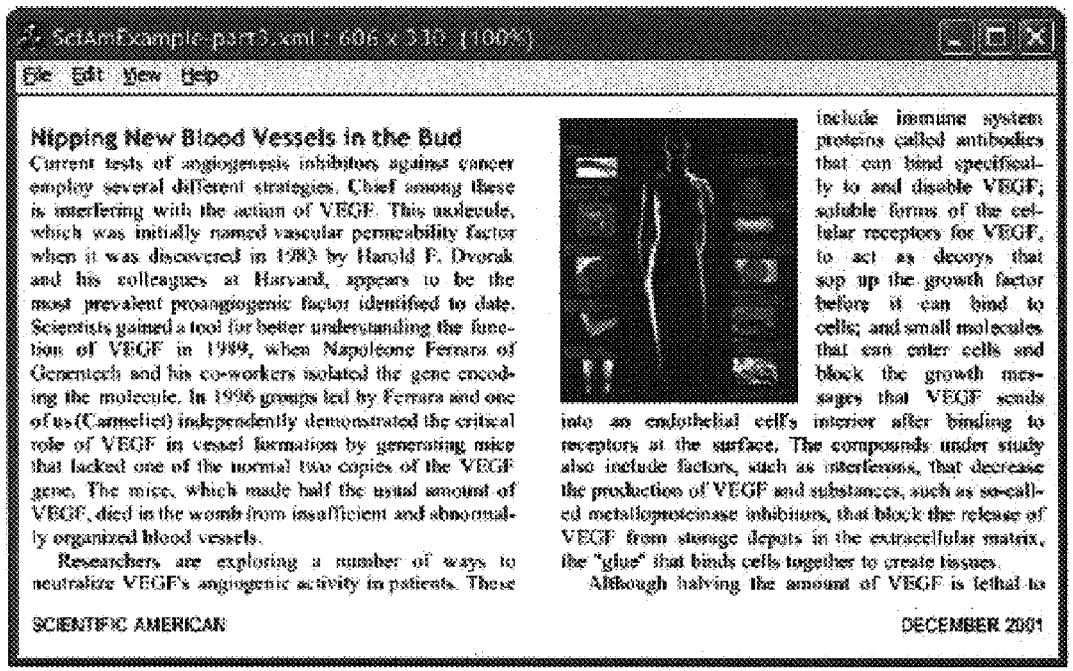
FIGS. 16A through I provide a sequence of images showing how the adaptive document layout system's layout engine optimizes the layout using alternate content to overcome typical layout problems.
Figure 16B:
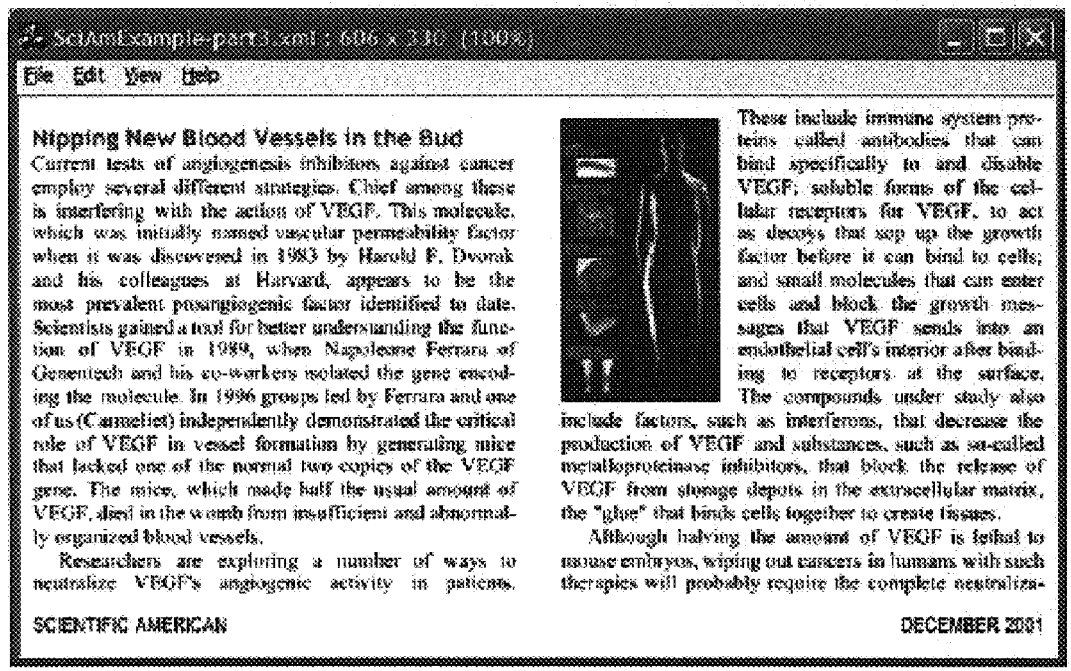

FIGS. 16A-I show some other ways in which the layout engine's optimization procedure takes advantage of alternate content to prevent typical layout problems. FIGS. 16A and 16B illustrate how alternate content can be used to prevent widows/orphans, common undesirable artifacts. The top image illustrates a viewing situation that results in a widow at the bottom of the second column, and the figure below shows how the layout engine prevents this artifact by displaying an alternate version of the second image. Since the presence of widows and orphans results in bad layout scores, the optimizer chooses content that avoids them if at all possible.

Figure 16C:
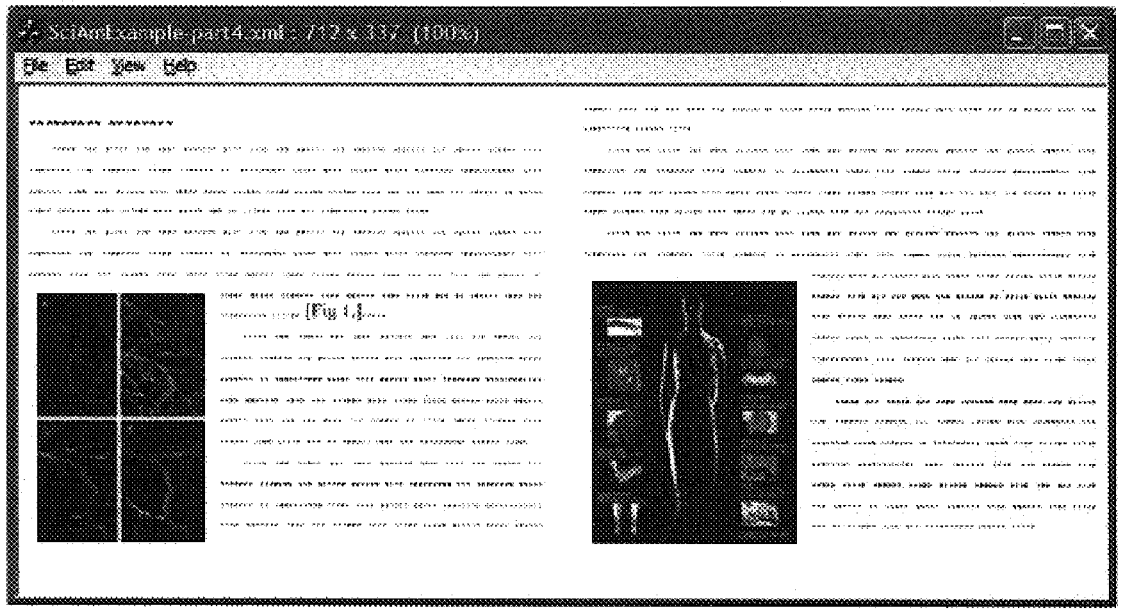
Figure 16D:
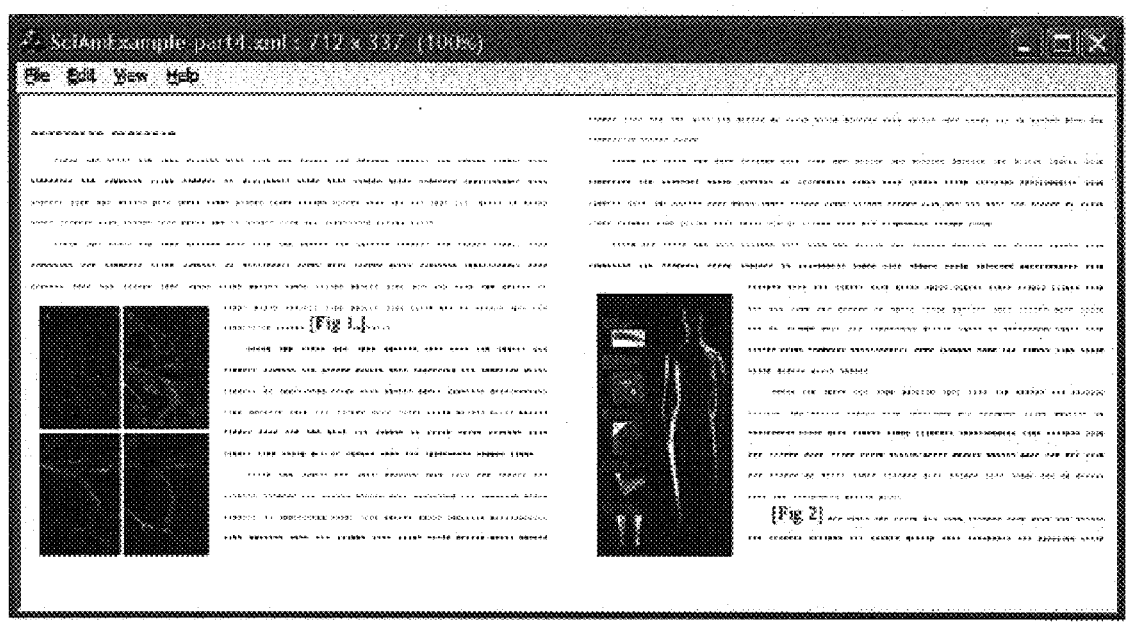

Another frequent layout problem is figure/reference separation—that is, when a figure gets pushed off the page on which a reference to it appears, or vice versa. FIGS. 16C and 16D indicate how multiple representations can be used to avoid this situation. Once again, the top image shows the layout that would have been produced without any alternate versions of content, in which the reference to "FIG. 2" has been pushed off the page by the very figure it references—a frustrating predicament that most people working with laying out documents have experienced at one time or another. With an alternate version of the second figure specified in the document, the layout engine succeeds in reuniting the errant reference.

Figure 16E:
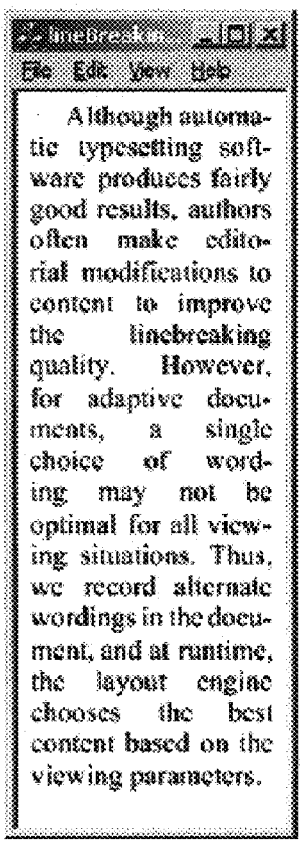
Figure 16F:
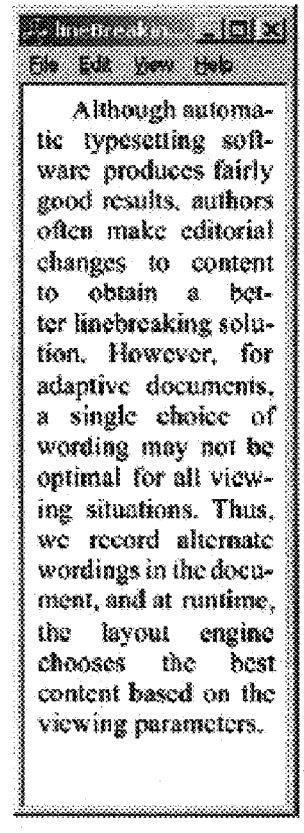
Figure 16G:
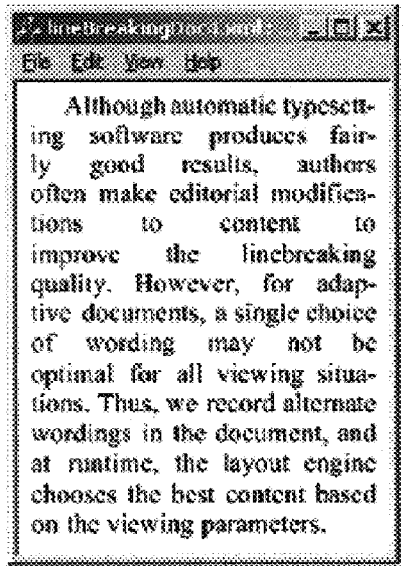
Figure 16H:
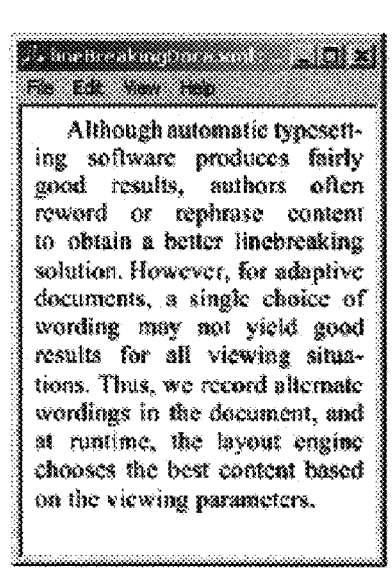
Figure 16I:

FIGS. 16E thorough 16H demonstrate how the line-breaking algorithm takes advantage of alternate content to produce the best possible results for justified text at different display sizes. For comparison, the results obtained using a version of the paragraph that does not contain alternate content is shown. Finally, FIG. 16I shows one simple benefit of using XSL templates to specify a document's style. Here, a Scientific American article is shown laid out using the style parameters of the TIME example.

4.0 Appendix

This appendix includes a section on the details of creating new manifold content regions and the details of the text-breaking algorithm used when creating adaptive documents.

4.1 Details on Creating New Manifold Regions

The system creates a new region of manifold content by modifying the document tree so that the highlighted content becomes the child of a new OR node. The operation can be described more precisely as a two-step process:

1. The system first tries to identify a sub-tree S that can exactly generate the region of content R highlighted in the edit pane. (If S satisfies this property it can be said that S corresponds to R, or alternately, that S is an R-corresponding sub-tree.) If no such sub-tree exists, the document tree is transformed validly such that the resulting tree contains a sub-tree that corresponds to R.
2. Once the system has located/created a sub-tree S that corresponds to R, a new OR node is inserted above S.

The first of these two steps is clearly the more challenging task, and can, in some cases, require a non-trivial tree transformation. In the following section, a general algorithm for performing this operation is described, as well as a simpler approach that places some restrictions on the set of regions that can be converted to have manifold content.

4.1.2 The Algorithm

Figure 17:
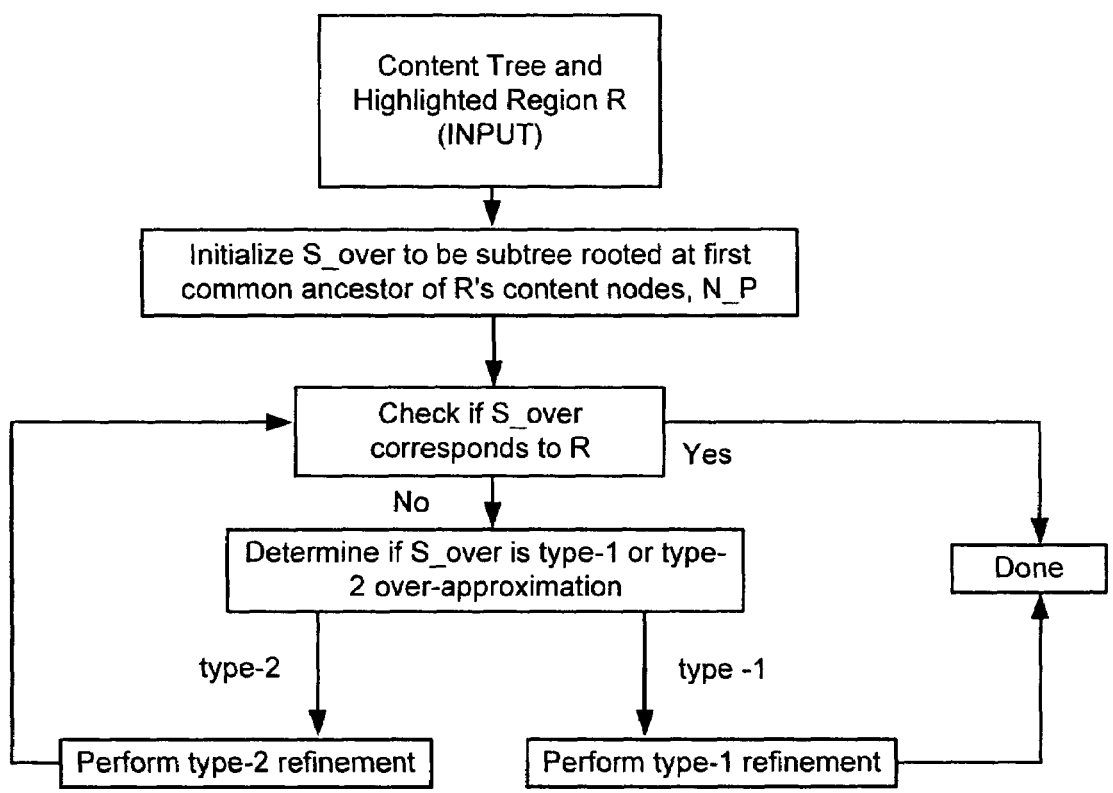
FIG. 17 provides a flowchart showing a detailed version of the algorithm for creating new versions of manifold content discussed in the Appendix.

At a high level, the algorithm can be described as follows. In the initialization step, a sub-tree $S_{over}$ is identified that contains all of R but may only be able to generate a strict superset of R's content. It is said that $S_{over}$ may over-approximate R, and $S_{over}$ can be thought of as a conservative estimate of an R-corresponding sub-tree. Next, a refinement step is performed that recursively improves $S_{over}$, stopping once the current estimate corresponds to R. Finally a new OR node is inserted above the sub-tree. A diagram of this algorithm is shown in FIG. 17.

Before describing the details of the algorithm, a convenient assumption is stated about R. Without loss of generality it can be assumed that R contains an integral number of content nodes, which is equivalent to saying neither the beginning or end of R bisects a content node. For any R that does not satisfy this property, there exists a simple, valid tree transformation that aligns R with content node boundaries. Suppose the beginning of R bisects node $N_b$; $N_b$ can just be replaced with an AND node whose first child is a content node containing the portion of $N_b$ not in R and whose second child is a content node containing the portion of $N_b$ that falls within R. A similar transformation can be made if the end of R bisects a node. Thus, only regions that contain an integral number of nodes need be considered.

4.1.2.1 Initialization

An initial estimate of $S_{over}$ by locating the first common ancestor node $N_p$ of all content nodes in R. Notice that $N_p$ must be an AND nodes, since content nodes in different child sub-trees of an OR node cannot (by definition) appear simultaneously in the edit pane (and thus, cannot be contained in R). Since the sub-tree $S_{Np}$ rooted at $N_p$ clearly contains all content nodes in R, it is a conservative estimate of an R-corresponding sub-tree. Thus, $S_{over}$ is set equal to $N_p$ and a check is made as to whether or not the estimate sub-tree already corresponds exactly to R. If yes, an OR node is simply inserted above $S_{over}$, and the operation is complete. Otherwise, refinements (described below) are performed until $S_{over}$ is R-corresponding.

4.1.2.2 Refinement

Given $S_{over}$, the system performs one of two different refinement operations, depending on the properties of the current conservative sub-tree estimate. In particular, all over-approximating can be classified into tow different types that determine which refinement procedure is executed.

Before describing these two categories, new terminology is introduced. Let $N_p$ be the root AND node of $S_{over}$ and let $N=\{N_1, \ldots, N_m\}$ denote the set of m child sub-trees of $N_p$. Since $S_{over}$ is a conservative estimate of an R-corresponding sub-tree, it is known that the content nodes in R are contained within a set of sub-trees $N_R \subseteq N$. Notice that since R is a contiguous highlighted region of content, NR must be a contiguous subset of N. For example, if m=10, $N_R$ might equal $\{N_4, \ldots, N_8\}$, but not $\{N_4, N_8, N_9\}$.

The properties that define a type-1 over-approximating sub-tree are as follows:

1. The sub-trees NR correspond exactly to disjoint portions of R that, when assembled, make up all of R's content.
2. $S_{over}$ is a strict subset of N.

Notice that the second property ensures $S_{over}$ is indeed an over-approximation. If $N_R$ were equal to N, then (according to the first property) $S_{over}$ would already be an R-corresponding sub-tree! The reason $S_{over}$ does not correspond to R is because there are sub-trees preceding and/or following NR that prevent $S_{over}$ from exactly generating R. Instead, $S_{over}$ can only instantiate a piece of content that contains R, with extra text and/or images surrounding the desired content.

Refining a type-1 over-approximation is trivial. $N_R$ is simply grouped under a new AND node $P_R$ that is inserted beneath $N_P$ at the appropriate position (FIG. 9). Due to the first property described above, the sub-tree is rooted at $P_R$ is guaranteed to be R-corresponding. Thus, the desired manifold region can be created by inserting a new OR node above $P_R$.

A type-2 over-approximating sub-tree can be defined as follows:

1. The sub-trees in $N_R$ do not correspond exactly to disjoint portions of R.
2. $N_R$ is a subset (not necessarily strict) of N.

Notice that any $S_{over}$ that does not fall into the first category will satisfy these properties. Thus, the types defined here are sufficient to classify all over-approximating sub-trees.

The first property here bears further investigation. If $|N_R|>1$, either: 1) the first sub-tree in $N_R$ does not correspond to the beginning portion of R; 2) the last sub-tree in $N_R$ does not correspond to the ending portion of R, or 3) both 1) and 2) apply. Note that the sub-trees between the first and last members of $_{NR}$ must correspond exactly to interior portions of R. If $|N_R|=1$, then clearly, the one sub-tree in $N_R$ cannot correspond to R.

These boundary problems arise when R partially overlaps one or more existing manifold regions. Specifically, suppose R overlaps the latter portion of M that falls outside of R, and let $M_{overlap}$ be the portion that overlaps R. Since it is assumed R is aligned with node boundaries, M contains at least two content nodes—one or more in $M_{outside}$, and one or more in $M_{overlap}$. Since part of M lies within R, it is known that $N_m$ must be located somewhere beneath $N_P$. More specifically, it is known $N_m$ must be contained within the first sub-tree ($N_{first}$) in $N_R$. Thus, the only instantiation of $N_{first}$ that contains $M_{overlap}$ also includes $M_{outside}$. In other words, $N_{first}$ does not correspond exactly to the initial portion of R, making $S_{over}$ an over-approximation. An analagous situation arises if the latter portion of R overlaps with the initial portion of an existing manifold region.

If $S_{over}$ is a type-2 approximation, the refinement operations proceed as follows. Given the previously stated invariant that the document tree is always alternating, it is known that all child sub-trees in N are either rooted with OR nodes or are single content nodes. For convenience, the child sub-trees of these OR nodes are referred to as grandchild sub-trees of $N_P$. Thus, in the terminology of classical propositonal logic, $N_P$ can be thought of as representing an expression in the conjunctive normal form (CNF). In this context, the first step in the refinement operation is a conversion from this representation to an equivalent expression in disjunctive normal form (DNF). The general form of this transformation can be illustrated using a simple example from logic:

$$(A \vee B)\hat{\ }(C(D)=(A(C)(A(D)(B(C)(B(D))$$

Basically, this conversion is performed by turning each combination of literals possible under the CNF expression into a conjunct in the DNF expression. Mapping this example back to the document tree domain, the parenthesized disjuncts and literals on the left side of the equation correspond respectively to members of N, and grandchild sub-trees of $N_p$. On the right side of the equation, parenthesized conjuncts correspond to new AND sub-trees that group together all possible combinations of the literals on the left. Thus, in terms of tree manipulations, the transformation involves replacing $N_p$ with an OR node $N'_p$ beneath which a set N' of AND sub-trees is inserted that contain all possible combinations of the grandchild sub-trees. Note that some grandchild sub-trees must be duplicated during this transformation. Finally, since this modification may result in a non-alternating document tree, a single-pass merge is performed (as described previously) to ensure that the tree alternates. After this tree transformation, the new estimate $S_{over}$ is the unique number N' that contains all the content nodes in R. A check is then made to see whether or not $S_{over}$ is R-corresponding, and if not, continue refining until it is.

4.1.2.3 Proof of Correctness

So, how does this transformation improve the approximation $S_{over}$? Put another way, how is it known repeated refinements will eventually lead to an R-corresponding sub-tree? Clearly, if a type-2 refinement ever leads to a type-1 over-approximation, it is known the operation will terminate. All that needs to be done is to perform a final type-1 refinement and the algorithm is done. As a result what ones needs to show is that a series of type-2 refinements will eventually lead to an R-corresponding sub-tree or a type-1 over-approximation.

By pushing the OR nodes at the roots of the N sub-trees up to $N'_P$, a type-2 refinement removes a set of OR nodes from $S_{over}$. Thus, repeated transformations will eventually remove all OR nodes from the approximation. At the same time, the transformation ensures that the new $S_{over}$ still contains all the content nodes in R. A sub-tree with no OR nodes that contains all of R's content nodes must either be R-corresponding or a type-1 over-approximation. As a result, the operation is guaranteed to terminate through some sequence of type-2 and type-1 refinement.

4.1.2.4 A Simplification

Although the algorithm as presented is fully general (that is, it will handle arbitrary regions R), type-2 refinements can result in dramatic modifications of the document tree (including some duplicated nodes) that happen without the user's knowledge. It is feared that these changes to the document's structure might confuse the author when she creates a new manifold region. As a result, a mechanism has been implemented that checks whether or not the user's choice of R will require any type-2 refinements before proceeding with the operation. This is done simply by performing the initialization step and then checking to see if $S_{over}$ is a type-1 over-approximation. If not, then it is known at least one type-2 refinement will be necessary, and the system asks the user if she would like the tool to automatically modify R to simplify the operation. This modification involves expanding R so that any boundary problems (as described above) are resolved. A simple type-1 refinement is performed to create a new manifold region.

4.2 Line-Breaking with Alternate Text

The following paragraphs describe an efficient method for line-breaking a paragraph with multiple versions of text in an optimal way. The present approach extends Knuth's classic dynamic-programming-based line-breaking algorithm to optimize over alternate wordings within the input paragraph. First it is explained how the original algorithm works, before moving on to discuss the modified version.

4.2.1 Problem Definition

The standard line-breaking problem asks how to break a given paragraph of text into lines in the best possible way, as determined by some measure of goodness. In the following paragraphs, the objective is to create justified text, for which the measure simply considers how well each line fits into the available space. More specifically, the goal is to achieve some specified, optimal inter-word spacing that is neither too small (resulting in cramped, hard-to-read text) nor too large (resulting in sparse, hard-to-read text).

Knuth's original line-breaking paper formulates this problem statement in a more quantitative way, by defining a scoring system that assigns badness values to lines based on how well they fit. In this system, only positive scores are allowed, with smaller badness indicating a better fit. Knuth proposed a number of ways to actually compute badness values, each of which can be distinguished by a few specific details. As expected, all of them penalize a line based on how much its inter-word distance deviates from the desired spacing. If the line's words are too close or too far apart, it receives a larger badness. The reader is referred to Knuth's paper [8] for more details on this topic. However, for the purposes of this discussion, it is simply assumed that one of these metrics can be used to compute the badness of a given line. Thus, the line-breaking problem can be restated quantitatively as follows: Given a paragraph of text, break it into lines whose cumulative badness is minimized.

4.2.2 Standard Line-Breaking Via Dynamic Programming

4.2.2.1 Overview of Algorithm

The first step of Knuth's algorithm is to determine from the input paragraph a set of potential break points $B=\{b_1, \ldots b_n\}$, where $b_1$ is defined to be the position immediately preceding the first word and $b_n$ to be the position immediately following the last word. This set includes all inter-word spaces as well as legal hyphenation positions within words. Given B, the objective is now to find the set of breaks $Bo \subseteq B$ that minimizes the paragraph's cumulative badness. Although one could perform this task by computing the badness for every possible set of linebreaks and simply picking the best solution, this would clearly be a very inefficient approach. Since one would be considering every element in the power set of B, this algorithm would run in exponential time with respect to n.

Knuth discovered that one can perform this computation more efficiently using dynamic programming. His key observation is that the line-breaking problem obeys the well-known principle of optimality, a prerequisite for any task solvable via dynamic programming techniques. Roughly put, any problem that obeys this principle can be decomposed into sub-problems of different sizes, each of which can be solved efficiently given the solutions to all smaller sub-problems. Dynamic programming algorithms take advantage of this property by tackling sub-problems in a bottom-up manner, starting with the smallest and ending with the largest problem.

The line-breaking problem can be decomposed as follows. Given input paragraph Q, its i-th partial paragraph is defined to be all the text from the beginning of Q until break point $b_i$. Thus, Q's second partial paragraph contains the first word in the text, and its i-th partial paragraph is just Q itself. Let $LB_i$ denote the subproblem of breaking Q's i-th partial paragraph, noting that is just the original task of dividing Q into lines. According to the principle of optimality, it is known that the solution to $LB_i$ can be solved efficiently given solutions to $LB_i$ through $LB_{i-1}$. Thus, Knuth's approach is simply to solve in order, updating the current set of known solutions at each step.

4.2.2.2 The Details

Given this overview, the specifics of the algorithm are now discussed. As with most dynamic programming techniques, the key implementation detail involves the data structures used to keep track of incremental solutions. For the purposes of Knuth's algorithm, it is useful to define two—S and P. Let S be an n-element array whose i-th value $S_i$ is the minimum cumulative badness of the solution to $LB_i$, and let P be an n-element array whose i-th value $P_i$ indicates the next-to-last break of the solution to $LB_i$. $S_i$ and $P_i$ are computed as follows:

$$S_i = \min_{1 \le j < i} (S_j + \beta_{ji}) \quad (1)$$

$$P_i = \arg\min_{1 \le j < i} (S_j + \beta_{ji}) \quad (2)$$

where $\beta_{ji}$ is the badness of the line starting after the j-th break and ending with the i-th break. Notice that $S_i$ and $P_i$ can be calculated in linear time as long as the values $S_1 \to S_{i-1}$ have already been computed. Given these definitions, the algorithm is very simple to describe. Using Equations 1-2, the elements of S and P can be computed in order. Once populated, these data structures contain all the information necessary to reconstruct the optimal break; $S_n$ holds the cumulative badness of the best solution, and by backtracking through P (starting at $P_n$), the actual set of breaks $B_o$ that achieves this minimum score can be recovered. To determine the actual text for each line of the paragraph, all the words between consecutive breaks in $B_o$ are collected.

As mentioned above, computing each element of S and P takes at most O(n) time. Thus, populating these data structures entirely takes $O(n^2)$ time. Since the reconstruction step is clearly linear, the time complexity of the entire algorithm is $O(n^2)$, considerably more efficient than the brute force, exponential time algorithm described earlier.

In the common case where a paragraph is to be laid out in a region of constant width, Knuth proposes a simple, performance-enhancing modification. When $S_i$ is computed, it is possible that some of the previous breaks $b_j$ considered when calculating the minimum value of $(S_j+\beta_{ji})$ are invalid. That is, if the text between $b_j$ and $b_i$ cannot possibly fit on a single line in the available region (without over-lapping), then is an invalid break with respect to $b_i$. The key observation is that a break that is invalid with respect to $b_i$ will be invalid for breaks $b_i+1 \to b_n$ as well. In other words, if the text between $b_j$ and $b_i$ cannot fit onto a line, the text between $b_j$ and $b_k$, for $i<k \leq n$, cannot possibly fit onto a line either. Thus, once a break point becomes invalid, it is no longer necessary to consider it when computing subsequent entries in S and P.

In practice, an active set A of all currently valid breaks is maintained. Notice that |A| is bounded by w, the maximum number of words that can possibly fit onto a line. At the beginning of the algorithm, A is initialized to Ø. When computing each entry $S_i$ and $P_i$, only the break points in A are considered:

$$S_i = \min_{b_k \in A} (S_j + \beta_{ji}) \quad (3)$$

$$P_i = \arg\min_{b_k \in A} (S_j + \beta_{ji}) \quad (4)$$

After recording these values, $b_i$ is added to A and (most significantly) any invalid break points found during the computation are removed. Thus, instead of taking time O(n) to compute each entry in S and P, it takes time O(w). As a result, the entire algorithm now takes O(nw), rather than $O(n^2)$ time. Since n is ordinarily much larger than w, this represents a significant performance improvement.

4.2.2.3 Problem Definition with Alternate Text

Thus far, the standard line-breaking approach for paragraphs of text has been described. However, for documents with multiple representations of content, the input is in general a paragraph with alternate versions of text—that is, a document tree with OR nodes that specify multiple wordings. In this context, the line-breaking problem can be reformulated as follows. Given an input paragraph with alternate text, find the optimal way of breaking the paragraph into lines considering all possible textual combinations.

4.2.2.4 Extending Knuth's Algorithm for Alternate Text

One naive way of computing an optimal line-breaking for a paragraph with alternate text would be to enumerate all possible versions of the paragraph (with all combinations of alternate text), run Knuth's algorithm on each one and then pick the solution that achieves the best score. However, since there are exponentially many combinations with respect to the number of OR nodes in the tree, this approach is highly impractical. In order to find the optimal line-breaking solution efficiently, a modified version of Knuth's method is used. The main idea is to include additional break points in that correspond to the various wordings specified in each OR node of the document tree. One then computes S and P as before, maintaining a bit of extra book-keeping to ensure one does not arrive at a solution that includes conflicting pieces of content (i.e. two pieces of content in different child sub-trees of a common OR ancestor). Since B contains potential break points over all different versions of the text, the resulting break $B_0$ represents the optimal solution with respect to all alternate content.

4.2.2.5 The Details

To determine B, the document tree is traversed, adding the appropriate break points for any visited piece of text. Note that two arbitrary breaks $b_i$ and $b_j$ in B can in general correspond to conflicting pieces of text. As a result, information is recorded about conflicting break points as the tree is traversed. More specifically, for each $b_i \in B$, one records $C(b_i)$, the set of conflicting breaks that precede $b_i$:

$$C(b_i) = \{b_j : 1 \leq i, b_j \text{ conflicts with } b_i\} \quad (5)$$

After this preliminary step, S and P are computed and $B_o$ is reconstructed exactly as in the original algorithm but for two differences. First, C must be taken into account. In particular, when computing $S_i$, one only considers those previous break points $b_j$ that do not appear in $C(b_i)$:

$$S_i = \min_{\substack{1 \leq j < i \\ b_j \in C(b_i)}} (S_j + \beta_{ji}) \quad (6)$$

$$P_i = \arg\min_{\substack{1 \leq j < i \\ b_j \in C(b_i)}} (S_j + \beta_{ji}) \quad (7)$$

Second, in determining the badness $\beta_{ji}$, one must consider all possible alternate content between breaks $b_j$ and $b_i$ that do not conflict with $b_i$, recording the combination of content that results in the minimum badness for that line. When building the actual text for the final paragraph from $B_o$, this information is used to ensure that the appropriate text is included in each line.

The restrictions imposed in Equations 6-7 on what break points can appear consecutively prevents the algorithm from finding an invalid solution. At the same time, since B includes break points from all the different pieces of text in the document tree, the final line-breaking solution is optimal with respect to all valid combinations of text. Thus, this extended version of Knuth's line-breaking algorithm correctly solves the line-breaking problem for alternate content. Furthermore, the use of dynamic programming allows the computation to be performed efficiently. Using Equations 6 and 7, it is possible to compute S and P in $O(n^2)$ time. (Note that in this case, n is the total number of breaks associated with all pieces of text in the input document tree. Since the reconstruction step is still linear, the total algorithm runs in $O(n^2)$ time as well. As with Knuth's original algorithm, efficiency can be improved by eliminating invalid break points from consideration as one computes S and P. However, the presence of alternate text somewhat complicates this modification. To illustrate the difficulty, let us assume that j<i and after computing $S_i$, it can be found that that $b_j$ is invalid with respect to $b_i$. In contrast to the original algorithm, one cannot necessarily conclude from this fact that $b_j$ is invalid with respect to all $b_k$, for i<k≦n. More specifically, for any $b_k$ that conflicts with $b_i$, no guarantees can be made that the text between $b_j$ and $b_k$ does not fit onto a line and therefore, $b_j$ must be considered when computing $S_k$ and $P_k$. However, for any $b_k$ that does not conflict with $b_i$, it is known that $b_j$ must be invalid, and can therefore ignore it when computing $S_k$ and $P_k$.

To handle this complication, one keeps track of which computations first invalidate a particular break point. In particular, $I(b_i)$ represents the set of breaks responsible for invalidating $b_j$:

$$I(b_j) = \{b_i : \text{computing } S_i \text{ invalidated } b_j\} \qquad (8)$$

At the beginning of the algorithm, initialize $I(b_i)=\emptyset$, for all $b_i \in B$. Then, when computing each entry $S_i$ and $P_i$, I is used to exclude the appropriate previous breaks from consideration:

$$S_i = \min_{\substack{1 \leq j < i \\ \alpha(i,j)}} (S_j + \beta_{ji}) \qquad (9)$$

$$P_i = \arg\min_{\substack{1 \leq j < i \\ \alpha(i,j)}} (S_j + \beta_{ji}) \qquad (10)$$

where $\alpha$ is defined as follows:

$$\alpha(i,j) = \exists b_k \in I(bj) \text{ s.t. } b_i \text{ does not conflict with } b_k. \qquad (11)$$

Although the notation is somewhat bulky, Equations 9-11 indicate that the calculation of $S_i$ and $P_i$ need only consider previous breaks $b_j$ that satisfy the following two conditions:

a) $b_j$ is a break that precedes $b_i (1 \leq j < i)$
b) at least one of the breaks $b_k$ responsible for invalidating $b_j$ does not conflict with $b_i (\exists b_k \in I(b_j) \text{ s.t. } b_i \text{ does not conflict with } b_k)$ If $b_j$ is considered in the computation (i.e. it satisfies these two conditions) and is invalidated, then $b_j$ is added to $I(b_i)$. As a result of this modification, the algorithm considers the minimum number of previous breaks when calculating each entry in S and P. However, unlike before, it is not possible to bound the computation of $S_i$ and $P_i$ by w. In the worst case, there may be a large amount of actual text in the document tree (i.e. n>>w), but every combination of content could fit on a single line. Thus, no break point would ever be invalidated while populating P and S. However, Equations 9-10 decrease the lower bound of the algorithm to $\Omega(nw)$. This running time can clearly be achieved using a degenerate input document tree that contains only one static version of the paragraph text. In contrast, notice that Equations 6-7 would result in an $n^2$ computation even with this degenerate input. In practice, it has been observed that significant performance improvements for paragraphs result with several alternate wordings.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Greg Badros, Alan Borning, Kim Marriott, and Peter Stuckey. Constraint cascading style sheets for the web. In *ACM User Interface Software and Technology Conference Proceedings*, 1999.

[2] Greg Badros, Jeffrey Nichols, and Alan Borning. Scwm—an intelligent constraint-enabled window manager. In *AAAI Smart Graphics Conference Proceedings*, 2000.

[3] Alan Borning, Richard Lin, and Kim Marriott. Constraints for the web. In *ACM Multimedia Conference Proceedings*, pages 173-182, November 1997.

[4] Alan Borning, Richard Lin, and Kim Marriott. Constraint-based document lay-out for the web. *Multimedia Systems*, 8:177-189, 2000.

[5] Alan Borning, Kim Marriott, Peter Stuckey, and Yi Xiao. Solving linear arithmetic constraints for user interface applications. In *ACM User Interface Software and Technology Conference Proceedings*, pages 87-96, October 1997.

[6] R. Furuta, J. Schofield, and A. Shaw. Document formatting systems: Survey, concepts and issues. *ACM Computing Surveys*, pages 417-472, 1982.

[7] R. Johari, J. Marks, A. Partovi, and S. Shieber. Automatic yellow-pages pagination and layout. Technical report, MERL, 1996.

[8] Donald E. Knuth and Michael F. Plass. Breaking paragraphs into lines. *Software—Practice and Experience*, 11:1119-1184, 1981.

[9] Hakon Wium Lie and Bert Bos. Cascading Style Sheets, Level 1, 1996.

[10] Arno J. H. Peels, Norbert T. M. Janssen, and Wop Nawijn. Document architecture and text formatting. *ACM Transactions on Information Systems*, 1985.

[11] Louis Weitzman and Kent Wittenburg. Automatic presentation of multimedia documents using relational grammars. In *ACM Multimedia Conference Proceedings*, pages 443-451, October 1994.

Wherefore, what is claimed is:

1. A computer-implemented process for creating an adaptive document, comprising using a computer to perform the following process actions:

inputting manifold representations of alternate document content that are modified versions of a same document content;

creating a document tree by associating each representation of alternate document content with a tree data structure, wherein OR nodes are used to organize said manifold representations of alternate document content in said tree data structure;

creating a new representation of alternate document content in the document tree by the following process actions:

inputting selected document content and said document tree;

looking for a document sub-tree that can exactly generate a selected region of the selected document content;

when an exact sub-tree is not found,
creating a new sub-tree corresponding to the region of selected document content; and
creating a new representation of alternate document content by modifying the document tree so that the created sub-tree corresponding to the region of selected document content becomes a child of a new OR node;

when an exact sub-tree corresponding to the selected document content is found, creating a new representation of alternate document content by modifying the document tree so that the found exact sub-tree corresponding to the region of selected document content becomes a child of a new OR node; and automatically formatting said manifold representations of document content to fit a viewing situation using said modified document tree, constraints and user preferences.

2. The computer-implemented process of claim 1 wherein each branch of said tree data structure represents an alternate version of document content.

3. The computer-implemented process of claim 2 wherein said tree data structure originates in an AND node and contains one or more children of alternate document content.

4. The computer-implemented process of claim 1 wherein
an AND node is used to specify a contiguous representation of document content in said tree data structure; and
an OR node is used to specify one of a plurality of pieces of alternate document content in said tree data structure.

5. The computer-implemented process of claim 1,
wherein said tree data structure is divided into sub-trees; and
wherein two sub-trees are considered equivalent if their structure creates identical sets of document views.

6. The computer-implemented process of claim 1 wherein said new representation of alternate document content associated with said new OR node is combined under an AND node with a content before the selected document content and a content after the selected document content.

7. The computer-implemented process of claim 1 wherein an Extensible Markup Language (XML) file format is used to specify said tree data structure.

8. The computer-implemented process of claim 7 wherein at least one of the following is used to represent document content structure:
an OR node representing a choice of content;
an AND node representing a contiguous representation of content;
a text node representing text content;
a div node representing a collection of content to be laid out in a rectangle; and
an image node representing an identifier associated with an image file.

9. The computer-implemented process of claim 1 wherein a user can modify alternate versions of content and wherein said user modifications will modify said tree data structure.

10. The computer-implemented process of claim 9 wherein modifying the alternate versions of content modifies the tree data structure by at least one of the following:
deleting a version of document content will delete an OR node associated with said document content from said tree data structure;
copying a version of alternate content will duplicate said copied version of alternate version as a sub-tree to the document tree; and
copying a version of alternate content by using a special copy operation will copy a selected region of alternate content but not preserve its underlying structure in the document tree.

* * * * *